United States Patent [19]
Ishizu

[11] Patent Number: 5,541,958
[45] Date of Patent: Jul. 30, 1996

[54] CLOCK RECOVERY CIRCUIT OF DEMODULATOR

[75] Inventor: Fumio Ishizu, Kamakura, Japan

[73] Assignee: Mitsubishi Denki Kabushiki Kaisha, Tokyo, Japan

[21] Appl. No.: 163,312

[22] Filed: Dec. 8, 1993

[30] Foreign Application Priority Data

Dec. 11, 1992 [JP] Japan .................................. 4-331682
Jul. 8, 1993 [JP] Japan .................................. 5-168832

[51] Int. Cl.⁶ .................................................. H04L 27/22
[52] U.S. Cl. ........................ 375/326; 375/328; 329/358
[58] Field of Search .................................... 375/324–328; 329/306, 308, 323–326, 346, 358–361; 348/508, 538

[56] References Cited

U.S. PATENT DOCUMENTS

| | | | |
|---|---|---|---|
| 4,539,524 | 9/1985 | Goode | 375/327 |
| 4,856,030 | 8/1989 | Batzer et al. | 375/354 |
| 4,896,336 | 1/1990 | Henely et al. | 375/324 |
| 5,056,115 | 10/1991 | Meuriche | 375/327 |
| 5,073,904 | 12/1991 | Nakamura et al. | 375/340 |
| 5,249,204 | 9/1993 | Funderburk et al. | 375/327 |

FOREIGN PATENT DOCUMENTS

| | | |
|---|---|---|
| 0092400 | 4/1982 | European Pat. Off. . |
| 0222593 | 5/1987 | European Pat. Off. . |
| 0412234 | 2/1991 | European Pat. Off. . |

OTHER PUBLICATIONS

L. P. Sabel and W. G. Cowley, "A Recursive Algorithm for the Estimation of Symbol Timing in PSK Burst Modems", IEEE Global Telecommunications Conference, vol. 1, Dec. 9, 1992, Orlando, Florida, pp. 360–364.

Shousei Yoshida, Hideho Tomita "A New Coherent Demodulation Technique for Land–Mobile Satellite Communications" International Mobile Satellite Conference, Ottawa, 1990.

Primary Examiner—Young T. Tse
Attorney, Agent, or Firm—Wolf, Greenfield & Sacks, P.C.

[57] ABSTRACT

A clock recovery circuit capable of outputting decision point data without causing any slip of a recovered clock in the case of operation in a continuous mode in a demodulator in which received signals are sampled by a fixed frequency clock to obtain the recovered clock and symbol data are demodulated by using this recovered clock. A shift register stores digital received signals obtained by an A/D conversion of quasi-coherent detection received signals, and a clock phase estimator calculates an estimated phase difference between an output value of a phase generator operated by the fixed frequency clock and a symbol clock of the received signals and outputs timing information and phase information of a decision point for discriminating the data of the received signals. An interpolator inputs the output signal of the clock phase estimator, takes in the digital received signals from the shift register and calculates decision point data by interpolation to output the same. The interpolator operates at the same cycle as the symbol clock on an average.

3 Claims, 21 Drawing Sheets

CLOCK RECOVERY CIRCUIT OF DEMODULATOR

BACKGROUND OF THE INVENTION

1. Field of the Invention

The present invention relates to a clock recovery circuit of a demodulator.

2. Description of the Related Arts

FIG. 24 illustrates a conventional clock recovery circuit, as disclosed in "A Study on High Speed Clock Recovery Circuit for all digital demodulator—Block Clock Recovery Scheme—", The Institute of Electronics, Information and Communication Engineers of Japan, Technical Report SAT90-31, November 1990. In FIG. 24, Ich and Qch signals obtained by a quasi-coherent detection are input to A/D (analog-digital) converters 4 and 5 from input terminals 1 and 2, respectively. A clock oscillator 3 generates a fixed frequency clock of this receiver to the A/D converters 4 and 5 and the A/D converters 4 and 5 operate in synchronism with this fixed frequency clock to perform the A/D conversion. Two random access memories RAM1 6 and RAM2 7 store one slot length of digital Ich and Qch signals. The RAM1 6 and the RAM2 7 constitute a two-port RAM 100. In this two-port RAM 100, while the signals are stored in one off the RAM1 6 and the RAM2 7, the signals stored in the other of the same are processed.

A non-linear processor 8 inputs the digital Ich and Qch signals and produces a clock component from the received signals. A clock phase detector 9 inputs the output signal of the non-linear processor 8 and detects a phase of a symbol clock of the received signals. The non-linear processor 8 and the clock phase detector 9 constitute a clock phase estimator 101. An interpolator 10 calculates an interpolation from the output signals of the two-port RAM 100 and the clock phase estimator 101 and outputs decision point data and the interpolated Ich and Qch data are output from respective output terminals 11 and 12.

FIG. 25 shows a construction of the non-linear processor 8 shown in FIG. 24. In FIG. 25, the digital Ich and Qch signals are input to first and second square circuits 22 and 23 via input terminals 20 and 21, respectively, and the first and second square circuits 22 and 23 square the input signals. An adder 24 sums the output signals of the first and second square circuits 22 and 23 and outputs the sum of them from an output terminal 25.

FIG. 26 shows a construction of the clock phase detector 9 shown in FIG. 24. In FIG. 26, a phase generator 32 inputs the clock signal output from the clock oscillator 3 via a clock input terminal 31 and operates in synchronism with the clock signal to output phase information (0 to $2\pi$ or $-\pi$ to $\pi$) of a symbol clock cycle. A COS/SIN wave generator 33 outputs sine (SIN) and cosine (COS) values corresponding to the output values of the phase generator 32. The output signal of the non-linear processor 8 is fed to first and second multipliers 34 and 35 via an input terminal 30 and the cosine and sine values output from the COS/SIN wave generator 33 are also sent to the first and second multipliers 34 and 35. The first and second multipliers 34 and 35 multiply the respective input signals and output the multiplication results to first and second integrators 36 and 37, respectively. The first and second integrators 36 and 37 each integrate one slot length of the respective multiplication result values.

A phase calculator 38 calculates an estimated phase difference between the symbol clock included in the received signals and the output value of the phase generator 32 from the output signals of the first and second integrators 36 and 37 to output the estimated phase difference from an output terminal 39.

Next, the operation of the above-described conventional clock recovery circuit will now be described.

First, the Ich and Qch signals input via the input terminals 1 and 2 are converted into digital Ich and Qch signals in synchronism with the clock signal of the clock oscillator 3 of the receiver in the A/D converters 4 and 5. At this time, the oscillation frequency of the clock oscillator 3 is set to nearly N times the symbol rate. That is, with n times of oversampling, the A/D conversion of the signals is carried out.

The obtained digital Ich and Qch signals are separated into two, and are input to the two-port RAM 100 and to the non-linear processor 8. In the non-linear processor 8, the Ich and Qch signals are squared in the respective first and second square circuits 22 and 23 and the squared results are summed in the adder 24 to output the addition result P(n). This is expressed in formula (1)

$$P(n)=\{I(n)\}^2 \qquad (1)$$

(N=0, 1, 2 ... )

wherein I(n) and Q(n) represent the A/D-converted Ich and Qch signals, respectively, at a sampling time n.

Next, the output signal P(n) of the non-linear processor 8 is fed to the first and second multipliers 34 and 35 which calculate the multiplication of the output signal P(n) by the respective cosine and sine values output from the COS/SIN wave generator 33 to output $D_c(n)$ and $D_s(n)$, respectively, as follows.

$$D_c(n)=P(n)\times\text{COS}\{\theta_{clk}(n)\} \qquad (2)$$

$$D_s(n)=P(n)\times\text{SIN}\{\theta_{clk}(n)\} \qquad (3)$$

(n=0, 1, 2 ... )
In these formulas, $$\theta_{clk}(n)=2\pi/N\cdot n \qquad (4)$$

(N=an oversampling number)
(n=0, 1, 2 ... )

wherein $\theta_{clk}(n)$ is a modulus of $2\pi$ and its obtainable value is $0 \leq \theta_{clk}(n) < 2\pi$.

Then, the first and second integrators 36 and 37 integrate one slot length of the outputs of the respective first and second multipliers 34 and 35 to output integrated values $S_c$ and $S_s$ as follows.

$$S_C = \sum_{k=0}^{L-1} D_C(k) \qquad (5)$$

$$S_S = \sum_{k=0}^{L-1} D_S(k) \qquad (6)$$

L: a sample number within one slot

The phase calculator 38 inputs the $S_c$ and the $S_s$ and calculates an estimated phase difference $\theta_o$(rad) between the symbol clock of the received signals and the output value of the phase generator 32 to output the calculation result to the output terminal 39. A calculation method of $\theta_o$ will be described as follows.

First, it is assumed that $S_{comp}$ is represented as a complex number as follows.

$$S_{comp} = S_c + jS_s \quad (7)$$

At this time, $\theta_o$ is expressed as follows.

$$\theta_o = arg(S_{comp}) \quad (8)$$

$(0 \leq \theta_o < 2\pi)$

That is, in the phase calculator 38, after the received signals are squared, a Discrete Fourier Transform (DFT) of the squared values at the frequency of the symbol clock of the received signals is calculated to obtain the phase information of the clock component of the received signals.

Then, the interpolator 10 interpolates the signals stored in the two-port RAM 100 by using the estimated phase difference $\theta_o$ as the output signal of the clock phase estimator 101 and calculates a value at a decision point (in the case of a Nyquist waveform, a Nyquist point) to output this value. As one example of an interpolating calculation, a method using the first-order Lagrange's formula will be described.

First, the interpolator 10 calculates the position of the decision point of the signals stored in the two-port RAM 100 from the estimated phase difference $\theta_o$. Now, it is assumed that $\theta_o$ is within the following formula $$2\pi/N \cdot i \leq \theta_o < 2\pi/N \cdot (i+1) \quad (9)$$

but i is an integer within a range of $0 \leq i \leq (N-1)$.

At this time, the a phase $\theta_D(n)$ at the decision point of the m-th symbol of the data stored in the two-port RAM 100 exists in a range represented in the following formula. In this case, L is the sample number within one slot.

$$N \cdot m + i \leq \theta_D(n) \leq N \cdot m + (i+1) \quad (10)$$

$(m = 0, 1, 2 \ldots)$ $$N \cdot m + (i+1) \leq L - 1$$

Next, in the interpolator 10, in order to calculate the respective Ich and Qch decision point data I(m) and Q(m) of the m-th symbol by using the interpolation, the Ich and Qch data with subscript are read out of the two-port RAM 100 as follows.

$$I^-(m) = I(N \cdot m + i)$$

$$I^+(m) = I(N \cdot m + i + 1)$$

$$Q^-(m) = Q(N \cdot m + i)$$

$$Q^+(m) = Q(N \cdot m + i + 1) \quad (11)$$

By using the following formula, the decision point data I(m) and Q(m) are calculated and output.

FIG. 27 illustrates a principle of an interpolation process relating to Ich. As is apparent from FIG. 27, the following formula can be derived.

$$I(m) = \{a \cdot I^-(m) + b \cdot I^+(m)\}/(a+b)$$

$$Q(m) = \{a \cdot Q^-(m) + b \cdot Q^+(m)\}/(a+b) \quad (12)$$

wherein $a = 2\pi/N \cdot (i+1) - \theta_o$ and $b = \theta_o - 2\pi/N \cdot i$.

The interpolator 10 calculates one slot of data as described above and outputs the decision point data I(m) and Q(m) from the respective output terminals 11 and 12. At this time, the number of the data taken out of the two-port RAM 100 for the interpolation is different depending on an interpolation system applied and, for example, in the case of the second-order Lagrange's formula, three points near the decision point can be used.

As described above, although a case of the first-order Lagrange's formula has been described, a case of the second-order Lagrange's formula is also similarly described in the aforementioned document.

In the conventional clock recovery circuit, as shown in FIG. 24 to FIG. 27, the recovered clock can be produced based on the estimated phase difference between the output value of the phase generator and the symbol clock of the received signals. Hence, the period of the recovered clock becomes the period of the output signal of the phase generator operating in synchronism with the fixed frequency clock. In other words, in the conventional clock recovery circuit, of the recovered clock, only the phase difference from the output value of the phase generator is corrected but the frequency difference can not be controlled.

Therefore, in case of communication using a burst mode in which the estimated phase difference between the symbol clock of the received signals and the output value of the phase generator is hardly varied during a so-called burst, no problem arises, but in the case of a continuous mode transmission, this estimated phase difference can not be ignored. As a result, a slip of the recovered clock will occur.

SUMMARY OF THE INVENTION

Accordingly, the present invention is completed in order to solve the aforementioned problem and it is an object of the present invention to provide a clock recovery circuit which is capable of outputting decision point data without causing any slip of a recovered clock in the case of a continuous mode as well in a demodulator for sampling received signals by using a fixed frequency clock.

In order to achieve the object of the present invention, according to a first aspect of the present invention, there is provided a clock recovery circuit to be used for a demodulator, comprising: means for sampling quasi-coherent detection received signals by a fixed frequency clock; means for storing sample values of the received signals; non-linear processing means for producing a clock component from the sample values of the received signals; clock phase detecting means for obtaining an estimated phase difference between a symbol clock of the received signals and an output value of a phase generator operated by the fixed frequency clock on the basis of a non-linearly processed signal by the non-linear processing means; decision point detecting means for producing timing information and phase information of a decision point on the basis of the estimated phase difference; and interpolating means for inputting the sample values stored in the storing means and obtaining decision point data of each symbol by interpolation on the basis of the timing information and the phase information of the decision point, the interpolating means operating at the same cycle as the symbol clock of the received signals on an average.

In order to achieve the object of the present invention, according to a second aspect of the present invention, there is provided a clock recovery circuit to be used for a demodulator, comprising: means for sampling quasi-coherent detection received signals by a fixed frequency clock; means for storing sample values of the received signals; non-linear processing means for producing a clock component from the sample values of the received signals; clock phase detecting means for obtaining an estimated phase difference between a symbol clock of the received signals and an output value of a phase generator operated by the fixed frequency clock on the basis of a non-linearly processed signal by the non-linear processing means; decision point detecting means for extracting a nearest sampling time to a decision point and producing a latch pulse at this sampling time on the basis of an output signal of the clock phase detecting means; and a latch circuit for inputting the sample values stored in the storing means and obtaining decision point data for each symbol by using the latch pulse, the latch circuit operating at the same cycle as the symbol clock of the received signals on an average.

In order to achieve the object of the present invention, according to a third aspect of the present invention, there is provided a clock recovery circuit to be used for a demodulator, comprising: means for sampling quasi-coherent detection received signals by a fixed frequency clock; means for storing sample values of the received signals; non-linear processing means for producing a clock component from the sample values of the received signals; band pass filter means for inputting an output signal of the non-linear processing means and extracting a symbol clock component of the received signals; decision point detecting means for producing timing information and phase information of a decision point on the basis of the symbol clock component extracted by the band pass filter means; and interpolating means for inputting the sample values stored in the storing means and obtaining decision point data of each symbol by interpolation on the basis of the timing information and the phase information of the decision point, the interpolating means operating at the same cycle as the symbol clock of the received signals on an average.

In order to achieve the object of the present invention, according to a fourth aspect of the present invention, there is provided a clock recovery circuit for a demodulator, comprising: non-linear processing means for carrying out a non-linear processing of an analog-digital-converted quasi-coherent detection received signal; first multiplying means for multiplying each of COS/–SIN values (±1, 0) oversampled with a frequency of 4 times the non-linearly processed signal; means for averaging multiplied results obtained in the first multiplying means; second multiplying means for multiplying each of COS/–SIN values (±1, 0) oversampled with a frequency of 4 times an averaged result obtained in the averaging means; and addition means for summing multiplied results obtained in the second multiplying means.

In order to achieve the object of the present invention, according to a fifth aspect of the present invention, there is provided a clock recovery circuit for a demodulator, comprising: non-linear processing means for carrying out a non-linear processing of analog-digital-converted quasi-coherent detection received signals; first selecting means for alternately separating the non-linearly processed signals into first and second groups at a frequency of 4 times a symbol rate of the received signals; first code inversion/average means for alternately executing a first step of inversion/non-inversion of the first group of received signals separated by the first selecting means by a frequency of 2 times the symbol rate of the received signals, a second step of averaging the received signals obtained in the first step and a third step of inversion/non-inversion of received signals obtained in the second step by the frequency of 2 times the symbol rate of the received signals; second code inversion/average means for alternately executing a first step of inversion/non-inversion of the second group of received signals separated by the first selecting means by a frequency of 2 times the symbol rate of the received signals, a second step of averaging the received signals obtained in the first step and a third step of inversion/non-inversion of received signals obtained in the second step by the frequency of 2 times the symbol rate of the received signals; and second selecting means for alternately selecting output signals of the first and second code inversion/average means by the frequency of 4 times the symbol rate of the received signals.

In order to achieve the object of the present invention, according to a sixth aspect of the present invention, there is provided a clock recovery circuit for a demodulator, comprising: non-linear processing means for carrying out a non-linear processing of an analog-digital-converted quasi-coherent detection received signal; first inversion/non-inversion means for executing inversion/non-inversion of the non-linearly processed signal by a frequency of 2 times a symbol rate of the received signal; means for averaging an output signal of the first inversion/non-inversion means; and second inversion/non-inversion means for executing inversion/non-inversion of an output signal of the averaging means by the frequency of 2 times the symbol rate of the received signal;

The clock recovery circuit preferably further comprises interpolating means for interpolating a recovered clock signal oversampled with a frequency of 4 times the symbol rate of the received signal.

The clock recovery circuit preferably further comprises: level detecting means for detecting a level of the averaging means; and output level set means for controlling a level of an output signal of the averaging means by using an output signal of the level detecting means.

In the clock recovery circuit, the averaging means preferably includes: level detecting means for detecting a level of the averaging means; and holding means for holding an output signal of the averaging means by using an output signal of the level detecting means.

In the clock recovery circuit of the present invention, by using the timing information and the phase information of the decision point, which are produced based on the estimated phase difference between the symbol clock of the received signals and the output value of the phase generator operated by the fixed frequency clock, the interpolating means takes in the sample values from the storing means and obtains the decision point data of each symbol by the interpolation. The interpolating means is operated at the symbol clock frequency of the received signals on an average to output the decision point data without causing any slip of the recovered clock.

In the clock recovery circuit of the present invention, by using the latch pulse produced by extracting the nearest sampling time to the decision point based on the estimated phase difference between the symbol clock of the received signals and the output value of the phase generator operated by the fixed frequency clock, the latch circuit takes in the sample values from the storing means and obtains the decision point data of each symbol. The latch circuit is operated at the symbol clock frequency of the received signals on an average to output the decision point data without causing any slip of the recovered clock.

In the clock recovery circuit of the present invention, by using the timing information and the phase information of the decision point, which are produced based on the output value of the band pass filter means for extracting the symbol clock component of the received signals, the interpolating means is operated at the symbol clock frequency of the received signals on an average to output the decision point data without causing any slip of the recovered clock.

In the clock recovery circuit of the present invention, by multiplying each of COS/–SIN values of the symbol rate frequency to the output of the non-linear processing means, averaging the multiplied results, further multiplying each of COS/–SIN values to the averaged results and summing the further multiplied results, the clock recovery circuit can be operated at the symbol clock frequency of the received signals on an average to output decision point data without causing any slip of the recovered clock. Further, by using the COS/–SIN values such as ±1, 0 oversampled with the frequency of 4 times, it is not always necessary to use usual multipliers in the multiplying parts for multiplying the COS/–SIN values and by only selecting one of inversion/non-inversion/0, the calculation can be executed. Hence, the clock recovery circuit can be constructed using a small amount of hardware.

In the clock recovery circuit of the present invention, the non-linearly processed received signals are alternately selected to separate them into two groups at the frequency of 4 times the symbol rate of the received signals, and a pair of inversion/non-inversion+average+inversion/non-inversion means are alternately operated to process the two groups of signals at the frequency of 4 times the symbol rate. Then, the processed results of the two groups of signals are alternately selected at the frequency of 4 times the symbol rate to output the signals. Hence, the clock recovery circuit using a small amount of hardware and having a low power consumption can be obtained.

In the clock recovery circuit of the present invention, the inversion/non-inversion of the non-linearly processed received signals is executed at the frequency of 2 times the symbol rate of the received signals, and the obtained signals are alternately averaged by the averaging means having two kinds of storage functions. The inversion/non-inversion of the averaged signals is executed at the frequency of 2 times the symbol rate. Hence, the clock recovery circuit using of a small amount of hardware and a having low power consumption can be obtained.

The clock recovery circuit of the present invention preferably includes the interpolating means for interpolating the output recovered clock oversampled with the frequency of 4 times the symbol rate of the received signal. Thus, in this case, the recovered clock with high precision can be obtained.

In the clock recovery circuit of the present invention, the output level of the averaging means is preferably detected so as to control the output level of the averaging means, and thus the amplitude of the output signals can be restricted to a predetermined value. Hence, the clock recovery circuit having a small amount of hardware can be obtained.

In the clock recovery circuit of the present invention, the output level of the averaging means is preferably detected and the output value of the averaging means is held depending on the detected value. Hence, even when the received signal vanishes because of fading or blockage, the divergence of the recovered clock phase can be prevented.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
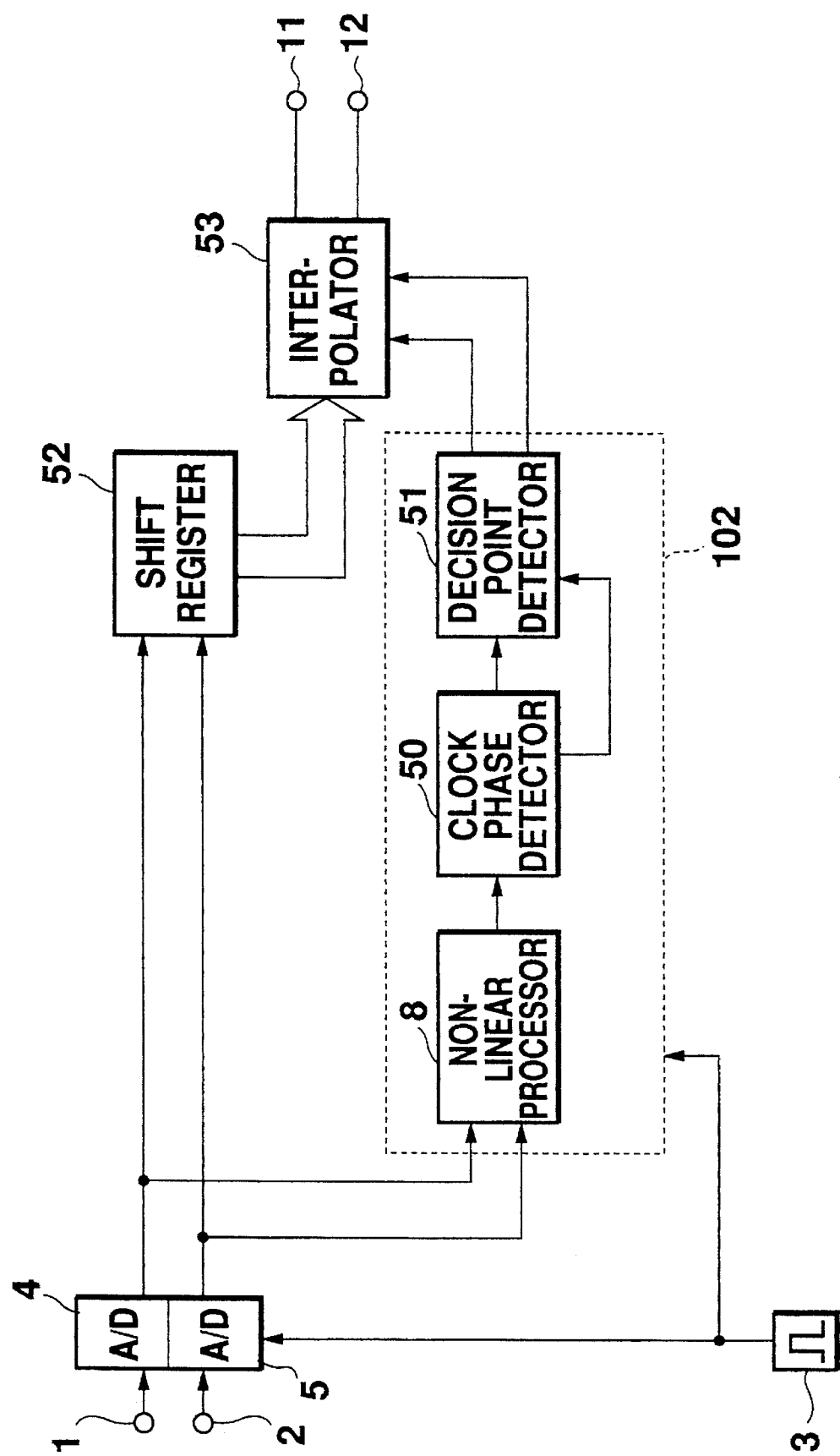
FIG. 1 is a block diagram of a first embodiment of a clock recovery circuit according to the present invention.

The present invention will now be described in connection with its preferred embodiments with reference to the accompanying drawings, wherein like reference characters designate like or corresponding parts throughout the views and wherein the same parts as those of the conventional embodiment described above are designated by the same reference characters and thus the repeated description of the same parts can be omitted for brevity.

The first embodiment of the present invention will now be described.

Figure 2:
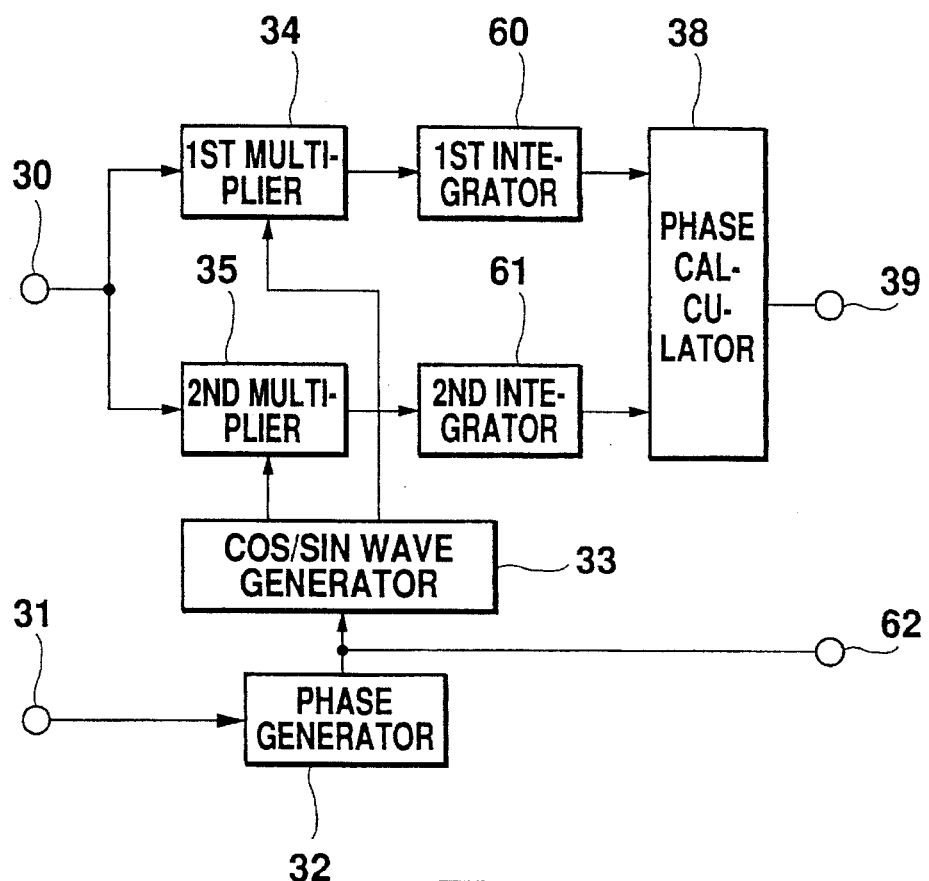
FIG. 2 is a block diagram of a clock phase detector shown in FIG. 1.

In FIG. 1, there is shown the first embodiment of a clock recovery circuit according to the present invention. In FIG. 1, the clock recovery circuit includes a non-linear processor 8, a clock phase detector 50, a decision point detector 51, a shift register 52 and an interpolator 53, as hereinafter described in detail. The non-linear processor 8, the clock phase detector 50 and the decision point detector 51 constitute a clock phase estimator 102. FIG. 2 shows one embodiment of the clock phase detector 50 and FIG. 3 shows one embodiment of the decision point detector 51.

In the drawings, the clock phase detector 50 has as an input an output signal of the non-linear processor 8 and a fixed frequency clock generated by a clock oscillator 3 and calculates an estimated phase difference between a symbol clock of the received signals and an output value of a phase generator 32 to output the output value of the phase generator 32 from an output terminal 62. The decision point detector 51 produces an interpolation start pulse (timing information of an decision point) and phase information of the decision point from the output signal of the clock phase detector 50. The shift register 52 operates in synchronism with the clock signal sent from the clock oscillator 3 to store digital Ich and Qch signals output from A/D converters 4 and 5. The interpolator 53 inputs the timing information of the decision point and the phase information of the decision point, takes in the digital Ich and Qch signals stored in the shift register 52 and calculates decision point data of each symbol by interpolation.

In FIG. 2, first and second integrators 60 and 61 integrate outputs of the respective first and second multipliers 34 and 35 in a time length corresponding to a time constant of the clock recovery circuit and the integrated results are fed to a phase calculator 38.

Figure 3:
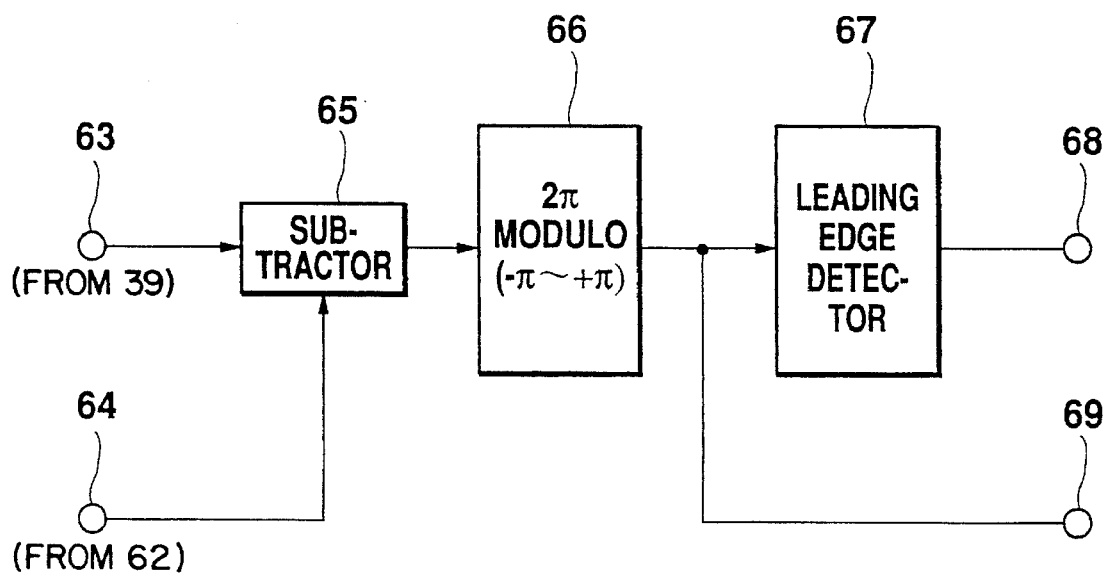
FIG. 3 is a block diagram of a decision point detector shown in FIG. 1.

In FIG. 3, the estimated phase difference (hereinafter referred to as an estimated phase difference of the symbol clock of the received signals) as the output signal of the clock phase detector 50 is input to a subtracter 65 via one input terminal 63. This estimated phase difference is the phase difference between the symbol clock of the received signals and the output value of the phase generator 32 operating by the clock of the clock oscillator 3. Also, the output value of the phase generator 32 is input to the subtracter 65 via another input terminal 64.

The subtracter 65 subtracts the estimated phase difference of the symbol clock of the received signals, input from the input terminal 63, from the output value of the phase generator 32, input from the input terminal 64. A modulus circuit 66 of 2π calculates a modulus (−π to +π) of 2π of the output value of the subtracter 65. A leading edge detector 67 detects a negative to positive transition of the output value of the modulus circuit 66 to output the interpolation start pulse from one output terminal 68. The output signal of the modulus circuit 66 is output from another output terminal 69.

Next, the operation of the clock recovery circuit described above will now be described with reference to FIG. 1 to FIG. 3.

First, the Ich and Qch signals obtained by a quasi-coherent detection are converted into digital signals in the A/D converters 4 and 5, and the obtained digital Ich and Qch signals are separated into two. That is, the signals are input to the clock phase estimator 102 and are also input to the shift register 52 operating by the clock signal of the clock oscillator 3. In the clock phase estimator 102, the estimated phase difference between the symbol clock of the received signals and the output value of the phase generator 32 operating by the fixed frequency clock is calculated in the same manner as the conventional method described above.

In this embodiment, one of the purposes is to apply the present invention to a continuous mode which can not ignore variation of the value of the estimated phase difference with the passage of time and thus this estimated phase difference is expressed by a time variant $\theta_o(n)$.

In the subtracter 65, the estimated phase difference $\theta_o(n)$ is subtracted from the output value $\theta_{clk}(n)$ of the phase generator 32 and in the modulus circuit 66 of 2π, the subtraction result is restricted to a range of −π to +π. The output signal $\theta_R(n)$ of the modulus circuit 66 is represented as follows.

$$\theta_R(n)=MOD\{\theta_{clk}(n)-\theta_o(n),2\pi\} \qquad (21)$$

In this case, $\theta_R(n)$ is operated by the clock of the clock oscillator 3 but the output value becomes a phase of a symbol clock component included in the received signals. Hence, $\theta_R(n)$ represents the symbol clock component included in the received signals respecting both the frequency and phase.

Next, the leading edge detector 67 discriminates a sign of $\theta_R(n)$ as indicated as follows.

$$\begin{aligned}\theta_{SIGN}(n) &= +1 \quad (\text{when } \theta_R(n) \geq 0) \\ &= -1 \quad (\text{when } \theta_R(n) < 0)\end{aligned} \qquad (22)$$

When $\theta_{SIGN}(n)$ changes from −1 to +1, it is discriminated that a decision point exists between the sample points, and thus an interpolation start pulse is output.

Figure 4:
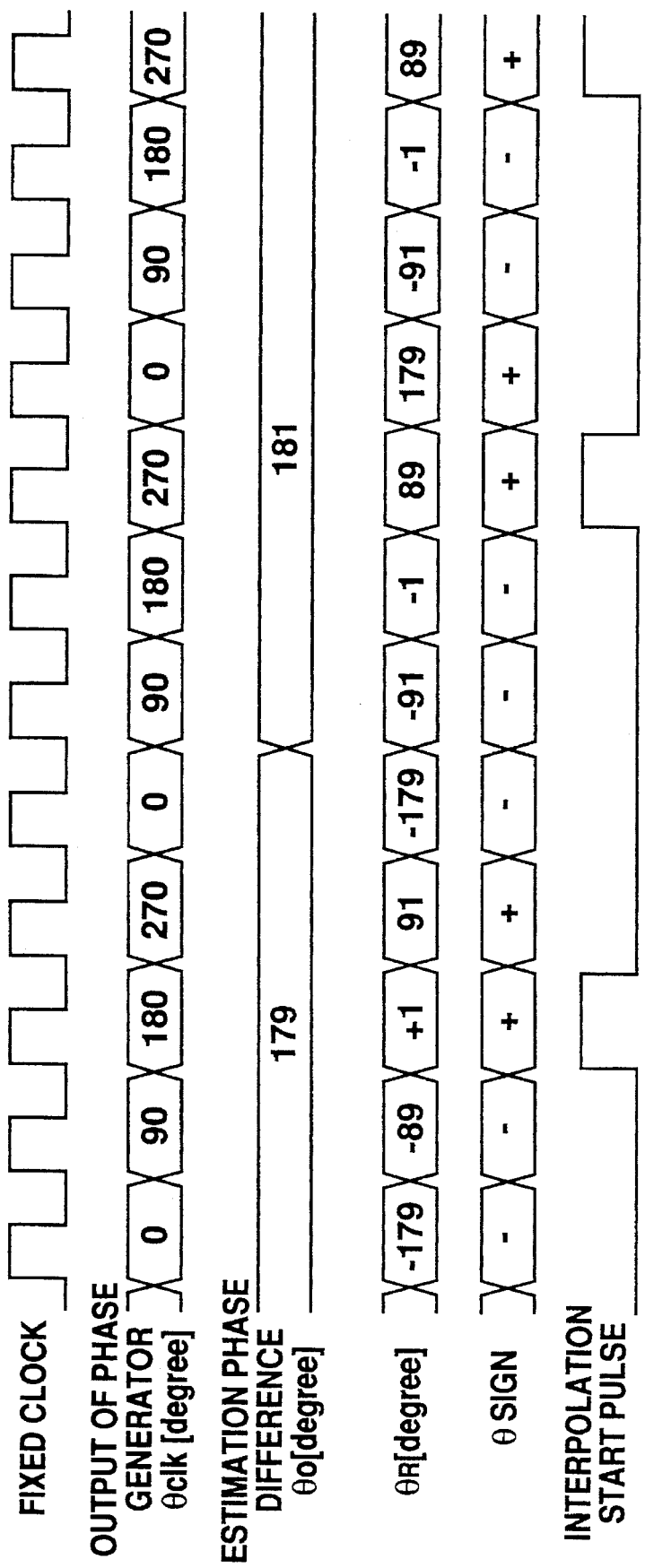
FIG. 4 is a timing chart showing one example of a production of an interpolation start pulse used in the clock recovery circuit shown in FIG. 1.

FIG. 4 illustrates a timing chart showing one example of a production of the interpolation start pulse. In this case, an estimated phase difference $\theta_o(n)$ is changed from 179 degrees to 181 degrees by an oversampling of 4 times.

The interpolator 53 inputs the interpolation start pulse and takes in the digital Ich and Qch signals stored in the shift register 52. Now, assuming that the output value of the phase generator 32 at an output timing of the interpolation start pulse is $\theta_P$, a stage number of the shift register 52 is set so that the A/D converted values multiplied by $\theta_P$ in the first and second multipliers 34 and 35 after being squared and summed may be positioned in the central portion of the shift register 52.

In this case, since the output signal of the phase generator 32 has a periodicity of 2π, the A/D converted values of n cycles before (n=0, 1, 2 . . . ) can obtain similar functions and effects.

The interpolator 53 calculates the decision point data of each symbol by interpolation by using the A/D converted values taken in and the output signal of the modulus circuit 66 of 2π as the phase information of the decision point and the obtained decision point data are output from output terminals 11 and 12 for respective Ich and Qch.

The second embodiment of the present invention will now be described.

Figure 5:
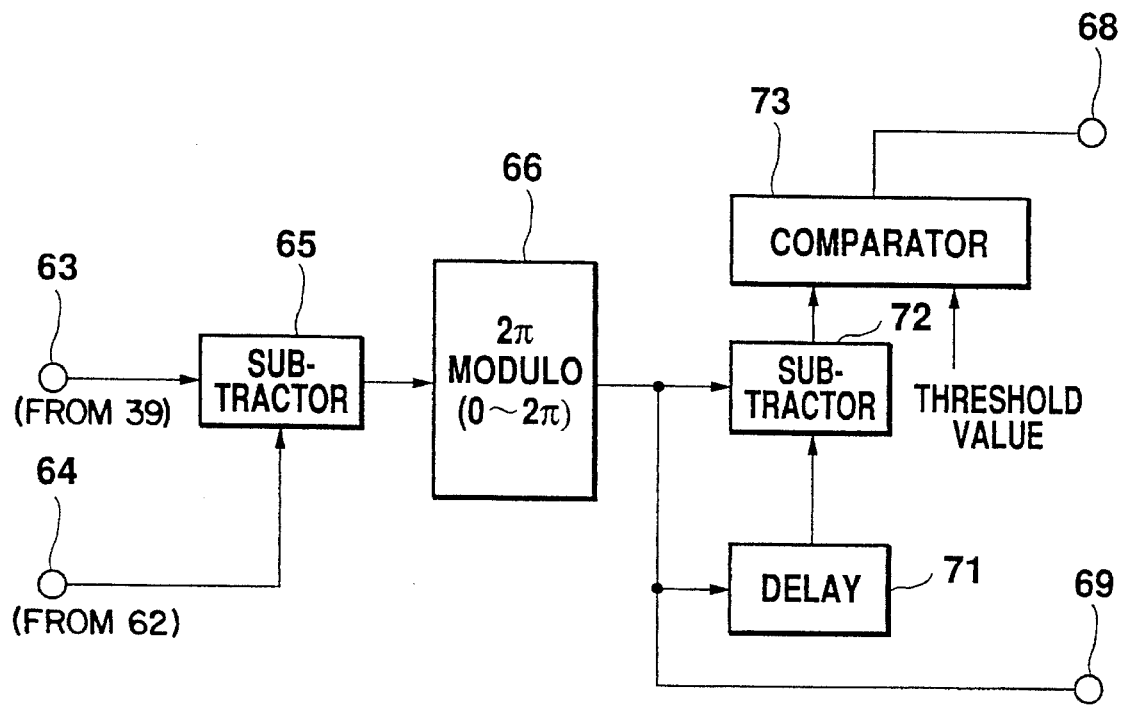
FIG. 5 is a block diagram of a decision point detector of a second embodiment a clock recovery circuit according to the present invention.

FIG. 5 shows another embodiment of a decision point detector 51 in the second embodiment of a clock recovery circuit according to the present invention. In this embodiment, as shown in FIG. 5, different from FIG. 3, a modulus circuit 70 of 2π calculates a modulus (0 to 2π) of 2π of the output value of the subtracter 65. A delay circuit 71 delays the output signal of the modulus circuit 70 one clock period of the clock oscillator 3. A subtracter 72 subtracts the output value of the modulo circuit 70 from the output value of the delay circuit 71, and a comparator 73 compares the output value of the subtracter 72 with a predetermined threshold value and outputs the interpolation start pulse when the output value of the subtracter 72 is beyond the threshold value.

Next, the operation of the decision point detector 51 shown in FIG. 5 will now be described.

The output signal of the subtracter 65 is restricted to a range of 0 to 2π, that is, the output value of the modulo circuit 70 is restricted to 0 to 2π thereby. The output signal of the modulo circuit 70 is divided into three, that is, it is input to the delay circuit 71, the subtracter 72 and the interpolator 53 from the output terminal 69. Now, assuming that the output value of the modulo circuit 70 of 2π is R(n), the output W(n) of the subtracter 72 is represented in the following formula.

$$W(n)=R(n-1)-R(n) \quad (23)$$

When a rising edge of a recovered clock exists between the output values R(n−1) and R(n) of the modulus circuit 70, the phase is changed from 2π to 0 and hence the phase variation amount W(n) between the two samplings becomes large. Thus, W(n) is supplied to the comparator 73, and, when W(n) is beyond the predetermined threshold value in the comparator 73, it is discriminated that the leading edge of the recovered clock exists between the two samplings. As a result, the interpolation start pulse is output.

The third embodiment of the present invention will now be described.

Figure 6:
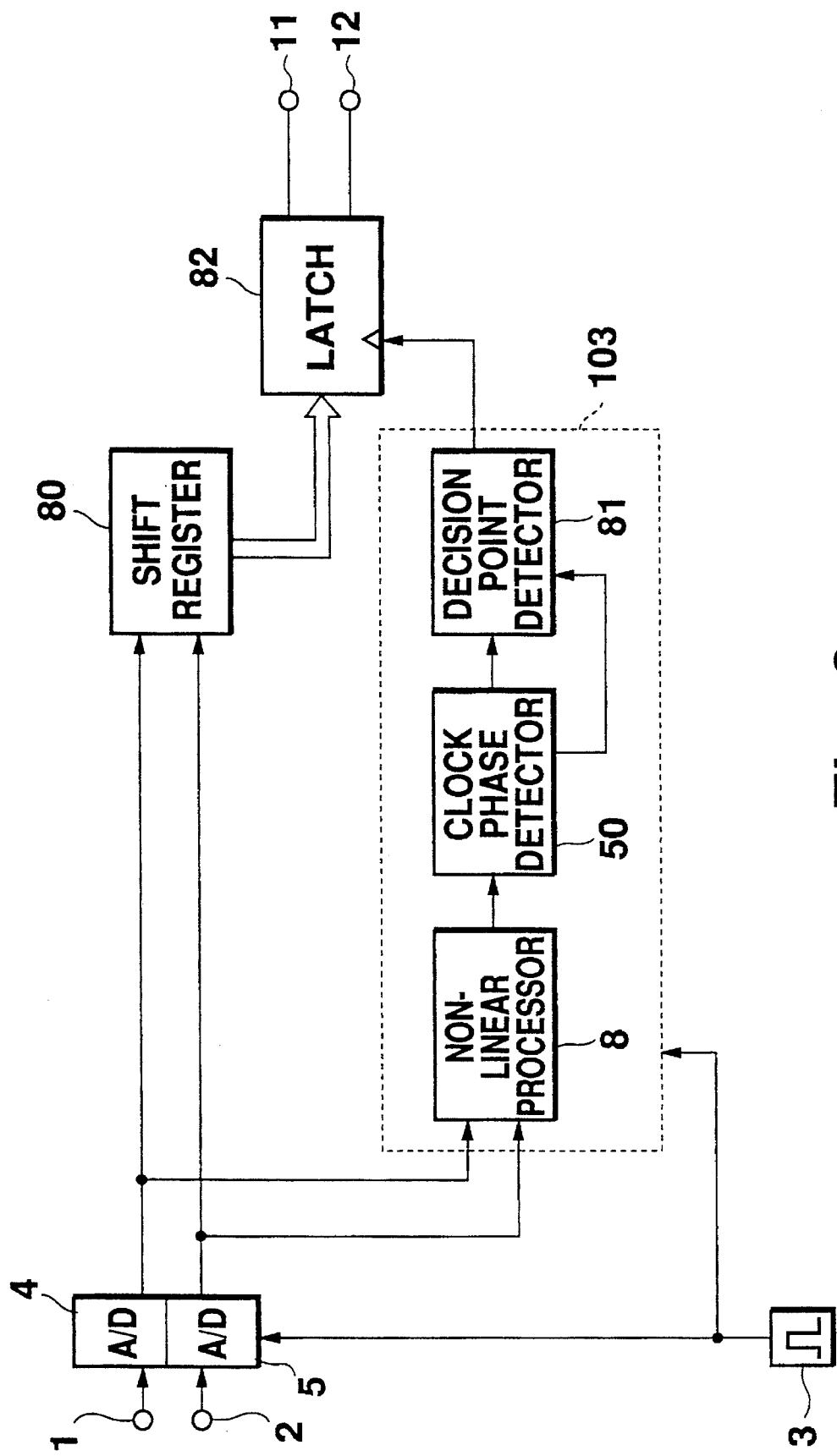
FIG. 6 is a block diagram of a third embodiment of a clock recovery circuit according to the present invention.

FIG. 6 illustrates the third embodiment of a clock recovery circuit according to the present invention. In this embodiment, as shown in FIG. 6, a shift register 80 is operated by a fixed frequency clock and stores the digital Ich and Qch signals. A decision point detector 81 calculates a sampling time nearest to the decision point on the basis of the output signal (estimated phase difference between the symbol clock of the received signals and the output signal of the phase generator 32) of the clock phase detector 50 and produces a latch pulse.

In this embodiment, the non-linear processor 8, the clock phase detector 50 and the decision point detector 81 constitute a clock phase estimator 103. A latch circuit 82 takes in the digital Ich and Qch signals stored in the shift register 80 and outputs the decision point data of each symbol.

Figure 7:
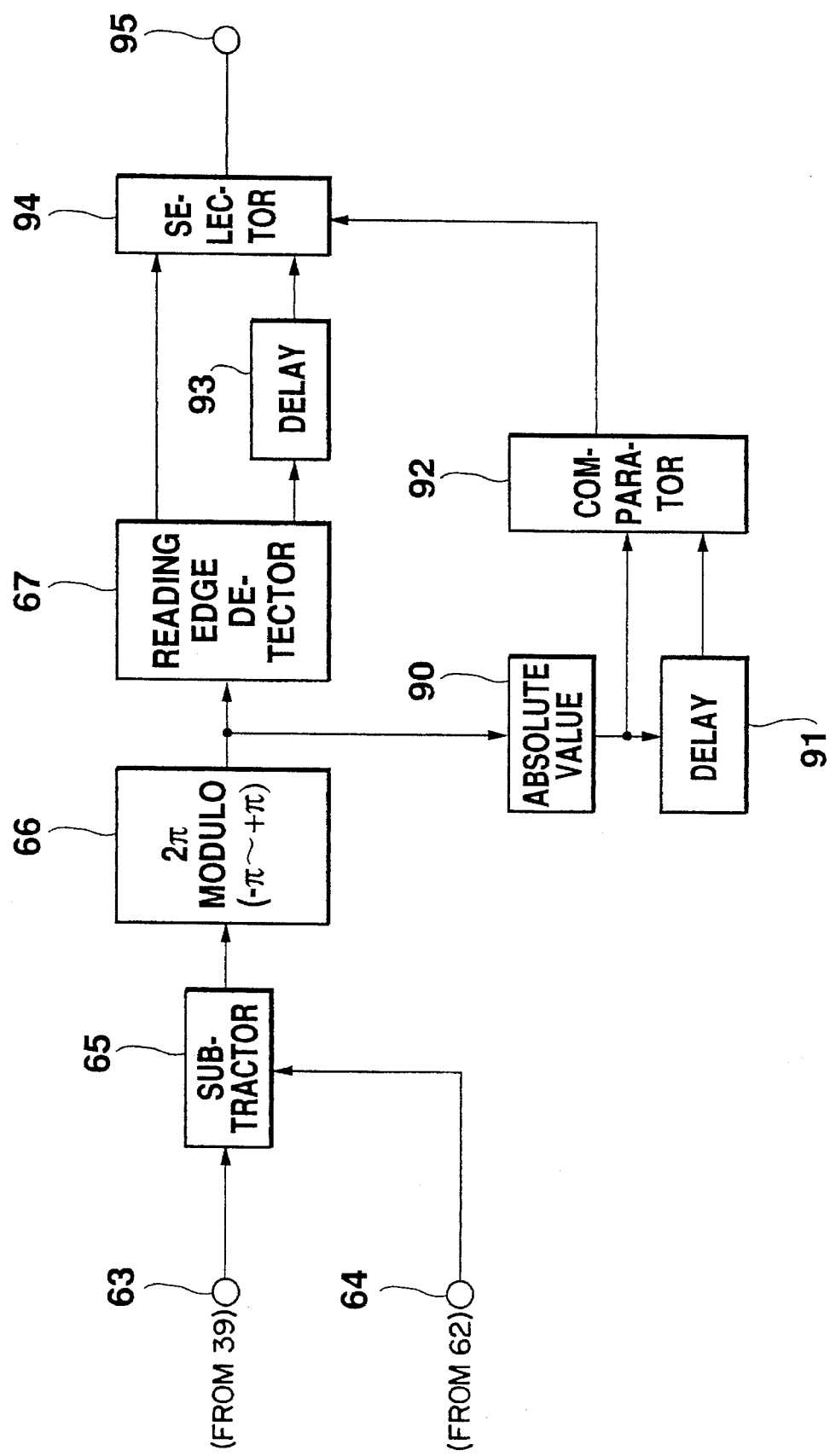
FIG. 7 is a block diagram of a decision point detector shown in FIG. 6.

FIG. 7 shows a construction of the decision point detector 81 shown in FIG. 6. In FIG. 7, an absolute value circuit 90 calculates an absolute value of the output signal of the modulus circuit 66 of 2π. A delay circuit 91 delays the output signal of the absolute value circuit 90 one clock period of the clock signal output from the clock oscillator 3. A comparator 65 92 compares the output signal of the absolute value circuit 90 with the output signal of the delay circuit 91. A second delay circuit 93 delays the output pulse of the leading edge detector 67 one clock period of the clock signal of the clock oscillator 3. A selector 94 inputs the output signal of the leading edge detector 67 and the output signal of the second delay circuit 93 and outputs one of these signals based on the output signal of the comparator 92. One signal selected by the selector 94 is output from an output terminal 95.

Next, the operation of the second embodiment of the clock recovery circuit described above will be described.

When the leading edge detector 67 of the decision point detector 81 shown in FIG. 7 discriminates that a decision point exists between two sampling points in the same manner as the first embodiment, the leading edge detector 67 outputs the latch pulse. The output signal of the modulus circuit 66 of 2π is input to the absolute value circuit 90, and the comparator 92 compares the output signal of the absolute value circuit 90 with the one clock delayed signal output from the delay circuit 91. Depending on the result of this comparison, it is detected which of the sampling points before or after the latch pulse is nearer to the decision point. The selector 94 receives the output signal of the comparator 92 and selects the output signal of the leading edge detector 67 when the preceding sampling point is nearer to the decision point or output signal of the second delay circuit 93 when the following sampling point is nearer to the decision point. The latch pulse as the selected signal of the selector 94 is output from the output terminal 95 to the latch circuit 82.

As described above, the latch circuit 82 inputs the latch pulse from the decision point detector 81 and latches the sampling values of the Ich and Qch signals nearest to the decision point in the shift register 80 to output the latched sampling values as the decision point data via the output terminals 11 and 12.

In this embodiment, in comparison with the above-described first embodiment, no interpolation calculation by the interpolator is executed, and the latch circuit is used. As a result, the construction of the clock recovery circuit is simplified.

The fourth embodiment off the present invention will now be described.

Figure 8:
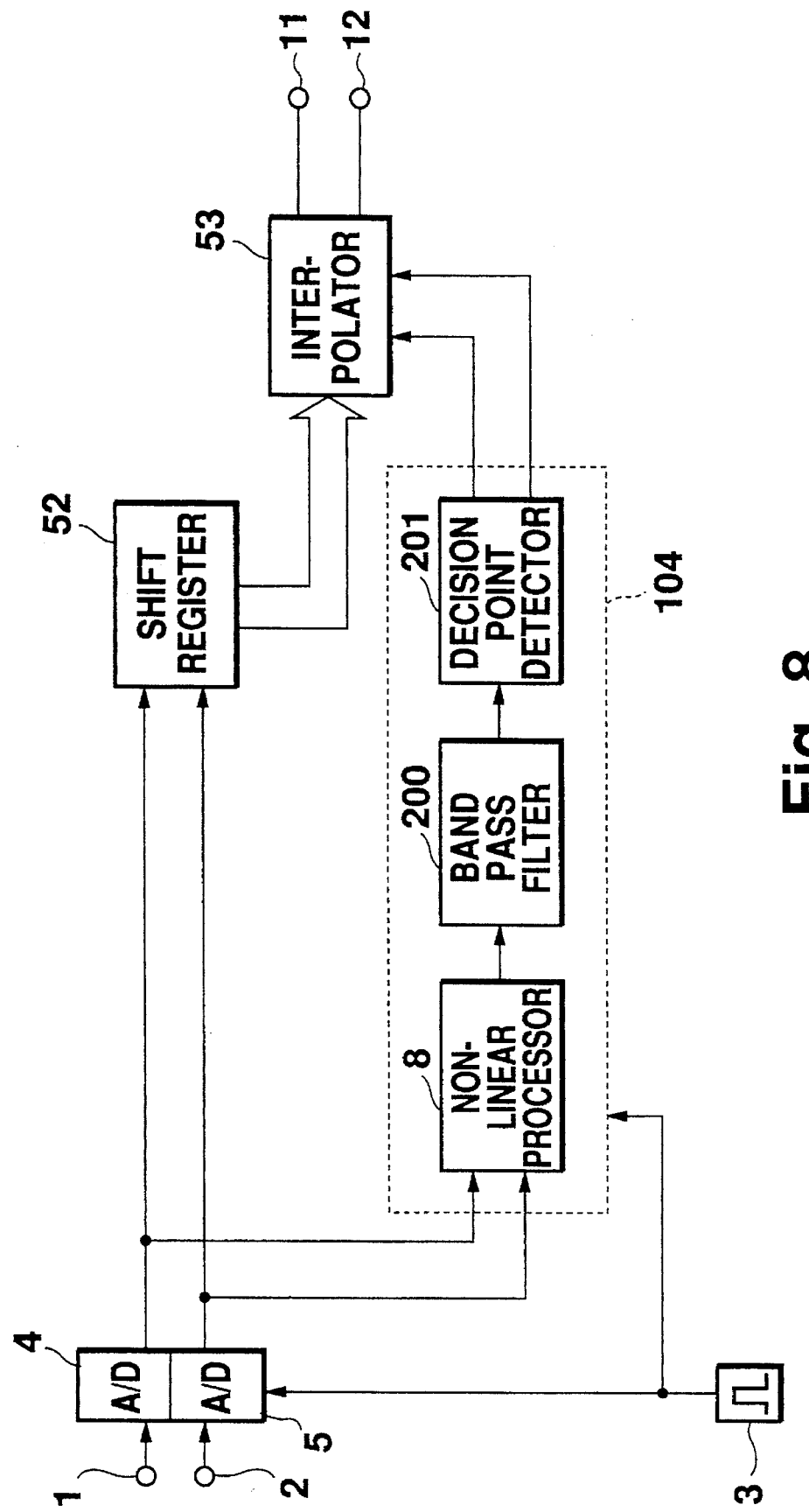
FIG. 8 is a block diagram of a fourth embodiment of a clock recovery circuit according to the present invention.

FIG. 8 illustrates the fourth embodiment of a clock recovery circuit according to the present invention. In this embodiment, as shown in FIG. 8, there is provided a BPF (band pass filter) 200 whose central frequency is the same as the symbol clock frequency of the received signals, and a decision point detector 201 produces an interpolation start pulse and decision point phase information on the basis of the output signal of the BPF 200. The non-linear processor 8, the BPF 200 and the decision point detector 201 constitute a clock phase estimator 104.

Figure 9:
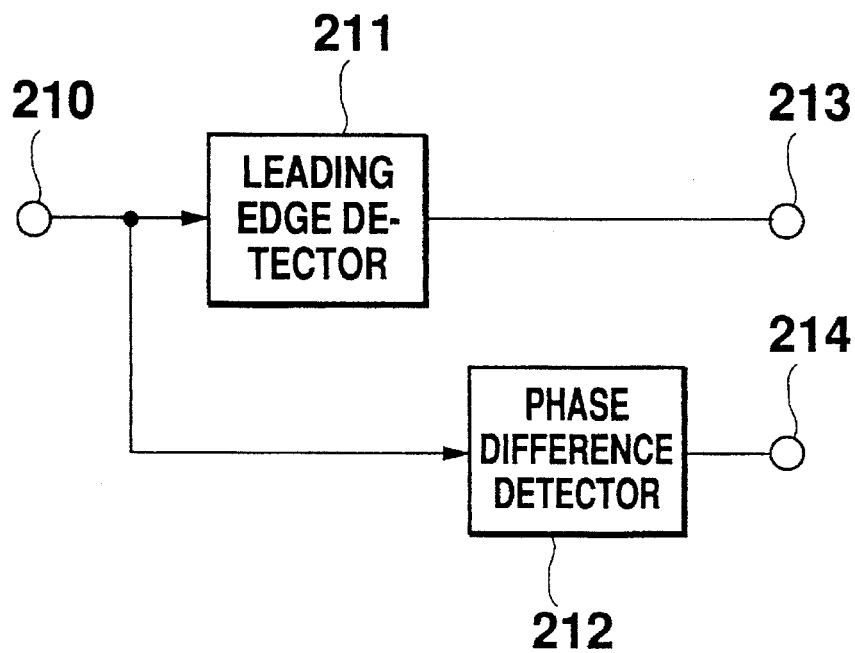
FIG. 9 is a block diagram of a decision point detector shown in FIG. 8.

FIG. 9 shows one embodiment of the decision point detector 201 shown in FIG. 8. In FIG. 9, the output signal of the BPF 200 is input to a leading edge detector 211 and a phase difference detector 212 via an input terminal 210. The leading edge detector 211 detects the leading edge of the input signal and outputs an interpolation start pulse on one output terminal 213. The phase difference detector 212 detects phase information of the input signal and outputs the phase information on another output terminal 214.

Next, the operation of the fourth embodiment of the clock recovery circuit described above will be described.

The output signal of the non-linear processor 8 is input to the BPF 200 whose central frequency is the same as the symbol clock frequency of the received signals and in the BPF 200, the symbol clock component of the received signals is extracted. In this case, the central frequency of the BPF 200 is the symbol clock frequency, as described above, and its band is set to the time constant that the clock recovery circuit operates.

Figure 10:
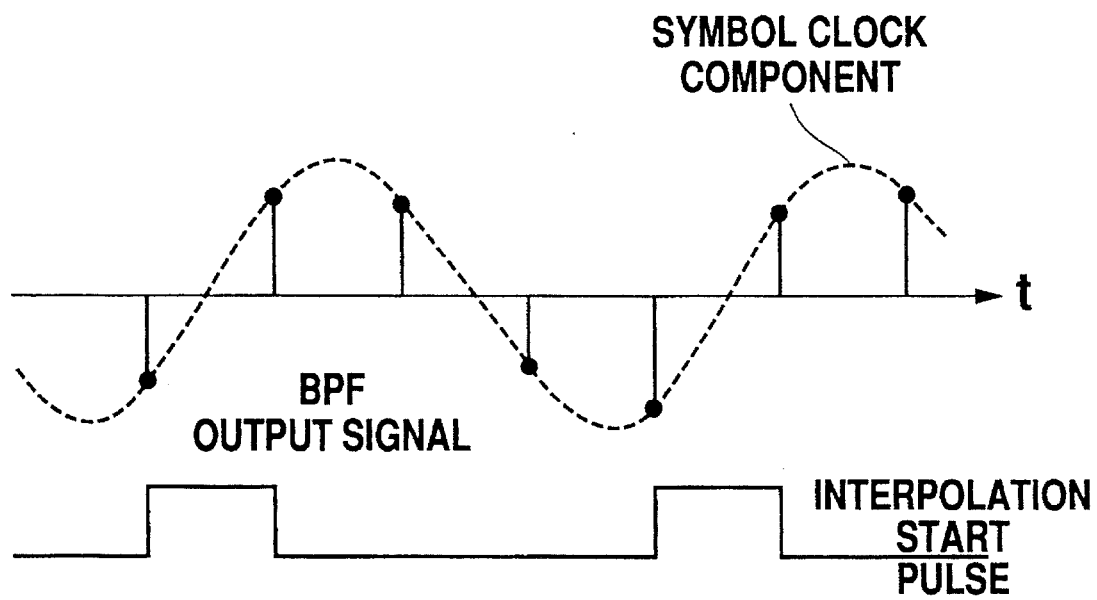
FIG. 10 is a timing chart showing one example of an output of a band pass filter used in the clock recovery circuit shown in FIG. 8.

FIG. 10 shows one example of the output signals of the band pass filter. In FIG. 10, a case where an A/D conversion is carried out by an oversampling of 4 times is shown. In FIG. 10, a sine wave indicated by a broken line represents the extracted symbol clock component and solid lines are actual sample values which represent the output signals of the BPF 200.

As shown in FIG. 9, in the decision point detector 201, after the output value of the BPF 200 is taken in via the input terminal 210, the changing timing of the sign of $\theta_R(n)$ shown in formula (22) from negative to positive is detected by the leading edge detector 211 and the interpolation start pulse is output via the output terminal 213. Also, the phase difference detector 212 detects the phase difference between the sampling points and the zero cross point on the basis of the output signal values of the BPF 200 at the timings before and after the interpolation start pulse is output and outputs the detected phase difference from the output terminal 214. In this case, this phase difference detection method can be preferably carried out as follows. That is, for example, the relationship between the phase differences and the output values of the BPF 200 at the timings before and after the interpolation start pulse is output is stored in a ROM in advance and the output values of the BPF 200 at the above-described timings are applied to the ROM as addresses to use the data output as the phase difference.

The interpolator 53 inputs the digital Ich and Qch signals from the shift register 52 on the basis of the interpolation start pulse and the phase information output from the clock phase estimator 104 and executes the interpolation calculation to obtain the decision point data. The obtained decision point data are output from the output terminals 11 and 12.

In this embodiment, different from the above-described embodiments, without carrying out the discrete Fourier transform by the clock recovery circuit, the band pass filter such as the BPF 200 is used and thus its construction is further simplified.

The fifth embodiment of the present invention will now be described.

Figure 11:
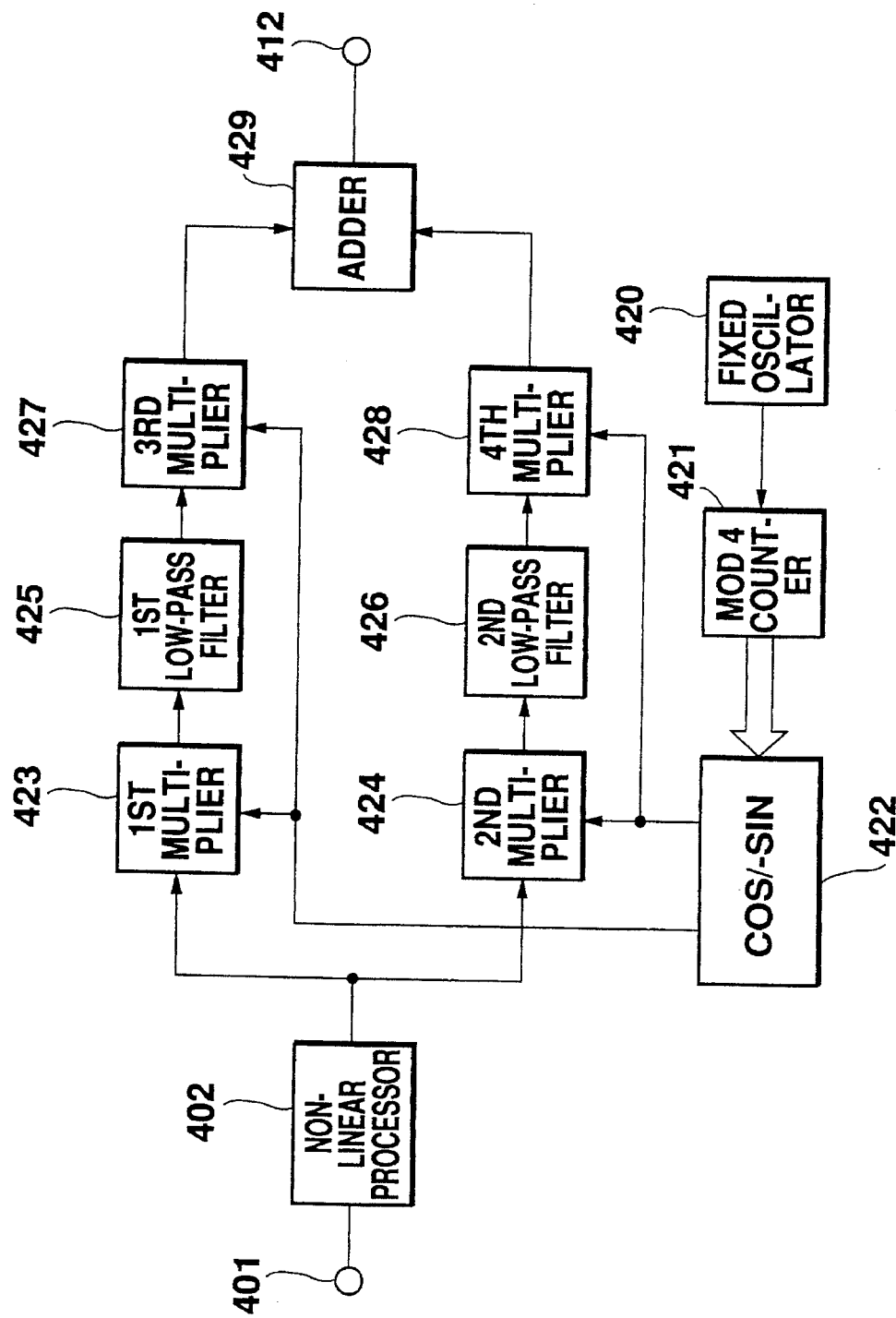
FIG. 11 is a block diagram of an essential part of a fifth embodiment of a clock recovery circuit according to the present invention.

FIG. 11 shows the fifth embodiment of an essential part of a clock recovery circuit according to the present invention, as a function, which corresponds to the clock phase estimator 104 shown in FIG. 8 except one output terminal in the fourth embodiment.

In FIG. 11, a fixed oscillator 420 generates a clock signal having a frequency of nearly 4 times the symbol clock frequency of the received signal. A counter 421 is a Modulus 4 counter operating by the clock signal output from the fixed oscillator 420. A COS/–SIN output circuit 422 receives the output signal of the counter 421 and outputs a COS (cosine) value and –SIN (sine) value. A first multiplier 423 multiplies an output value of a non-linear processor 402 by the COS value of the COS/–SIN output circuit 422 and a second multiplier 424 multiplies the output value of the non-linear processor 402 by the –SIN value of the COS/–SIN output circuit 422. First and second low-pass filters 425 and 426 equalize the output values of the first and second multipliers 423 and 424, respectively. A third multiplier 427 multiplies the output signal of the first low-pass filter 425 by the COS value of the COS/–SIN output circuit 422 and a fourth multiplier 428 multiplies the output signal of the second low-pass filter 426 by the –SIN value of the COS/–SIN output circuit 422. An adder 429 sums the output signals of the third and fourth multipliers 427 and 428 and the addition result is output from an output terminal 412.

Now, assuming that a frequency of a clock component included in the output signal of the non-linear processor 402 is $f_{clk}$, from the first and second low-pass filters 425 and 426, a frequency deviation $\Delta f$ with respect to a frequency $f_1$ of the fixed oscillator of the receiver is output. In this embodiment, this frequency deviation $\Delta f$ is multiplied by the fixed oscillation frequency $f_1$ of the receiver again and the frequency of the output clock signal becomes $\Delta f + f_1$.

Figure 12:
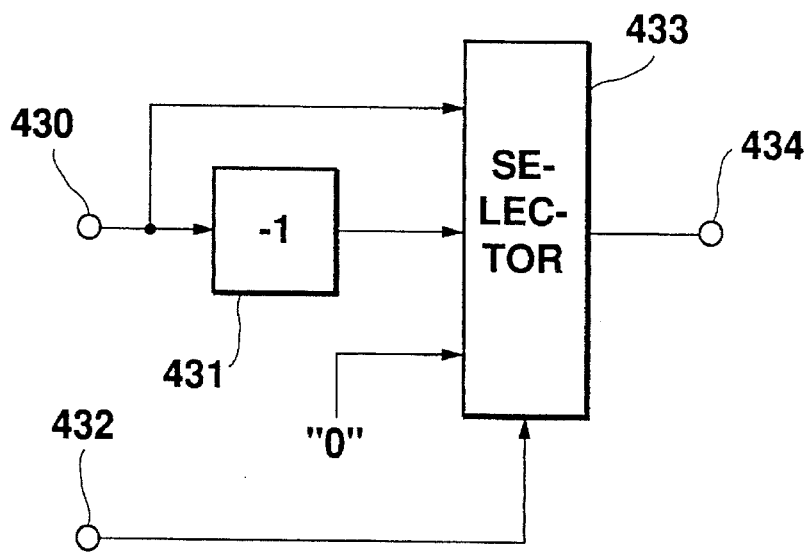
FIG. 12 is a block diagram of multipliers shown in FIG. 11.

FIG. 12 illustrates one example of construction of the multipliers shown in FIG. 11. As shown in FIG. 12, the code of the signal input via an input terminal 430 is inverted by an inverter 431. On the other hand, based on the output signal of the COS/–SIN output circuit 422, input via another input terminal 432, a selector 433 selects one of the signal input via the input terminal 430, the inverted input signal output from the inverter 431 and a zero "0" signal to output the selected one signal via an output terminal 434.

The non-linear processor 402 produces the symbol clock component from the received signal input via an input terminal 401, and the first and second multipliers 423 and 424 input this symbol clock component. In this case, the output value of the non-linear processor 402 is expressed by X(n) wherein n represents an integer indicating a sample timing. On the other hand, the fixed oscillator 420 operates at the frequency of nearly 4 times the symbol clock frequency and the Modulus 4 counter 421 operating by this clock of the 4 times frequency counts round such as 0, 1, 2 and 3 in one cycle of the symbol clock of the received signal. The COS/–SIN output circuit 422 inputs the output value of the counter 421 and outputs the COS value and the –SIN value. However, by considering the output signals (0, 1, 2 and 3) as (0, $\pi/2$, $\pi$ and $3\pi/2$), in the COS/–SIN output circuit 422, (1, 0, –1 and 0) are output from the COS side and (0, –1, 0 and 1) are output from the –SIN side.

The first and second multipliers 423 and 424 multiply the output signal of the non-linear processor 402 and the COS value and the –SIN value output from the COS/–SIN output circuit 422 and the output signals of the COS/–SIN output circuit 422 are only (±1 and 0), as described above. Hence, the output signals of the first and second multipliers 423 and 424 are restricted to any of three cases such as sign inversion/non-inversion/0. Accordingly, the construction of the first and second multipliers 423 and 424 is largely simplified, as shown in FIG. 12. Hence, when the output value of the COS/–SIN output circuit 422 is "1", the output signal of the non-linear processor 402 is output from the output terminal 434 as it is, and on the other hand, when the output value of the COS/–SIN output circuit 422 is "–1", the output signal of the sign inverter 431 is selected by the selector 433. Further, when the output value of the COS/–SIN output circuit 422 is "0", 0 is output from the selector 433. Thus, it is not necessary for the first and second multipliers 423 and 424 to each be composed of a normal multiplier and hence they can be realized by a simpler construction.

Now, assuming that the output values of the first and second multipliers 423 and 424 are Xm1(n) and Xm2(n), these values can be expressed as follows.

$$\begin{align}
Xm1(n) &= X(n) \cdot \cos(n \cdot \pi/2) \tag{24}\\
&= (-1)^{n/2} \cdot X(n) \quad &: n \text{ is even number}\\
&= 0 \quad &: n \text{ is odd number}\\
Xm2(n) &= X(n) \cdot -\sin(n \cdot \pi/2)\\
&= 0 \quad &: n \text{ is even number}\\
&= (-1)^{(n-1)/2+1} \cdot X(n) \quad &: n \text{ is odd number}
\end{align}$$

Next, the first and second low-pass filters 425 and 426 average the output signals Xm1(m) and Xm2(n) of the first and second multipliers 423 and 424 so as to remove noise components. Then, assuming that the output values of the first and second low-pass filters 425 and 426 are Xave1(n) and Xave2(n), these values can be represented as follows.

$$Xave1(n)=E[Xm1]=(\tfrac{1}{2})En{:}even[Xm1(n)]$$

$$Xave2(n)=E[Xm2]=(\tfrac{1}{2})En{:}odd[Xm2(n)] \qquad (25)$$

In these formulas, E[.] represents an averaging, that is, En:even[.] represents the averaging of only n-th signals (n is even numbers) and En:odd[.] represents the averaging of only n-th signals (n is odd numbers). The output signals of the first and second low-pass filters 425 and 426 are multiplied by the COS value and the −SIN value output from the COS/−SIN output circuit 422 in the third and fourth multiplier 427 and 428. However, the output values of the COS/−SIN output circuit 422 are only (±1 and 0), as described above, and hence the third and fourth multiplier 427 and 428 can be constructed by a largely simplified construction as shown in FIG. 12. The output values Xm3(n) and Xm4(n) of the third and fourth multiplier 427 and 428 are expressed as follows.

$$
\begin{aligned}
Xm3(n) &= Xave1(n) \cdot \cos(n \cdot \pi/2) & (26)\\
&= (-1)^{n/2} \cdot Xave1(n) \\
&= (-1)^{n/2} \cdot (1/2)En & : even[X(n)] \\
& & : n \text{ is even number} \\
&= 0 & : n \text{ is odd number} \\
Xm4(n) &= Xeve2(n) \cdot -\sin(n \cdot \pi/2) \\
&= 0 & : n \text{ is even number} \\
&= (-1)^{(n-1)/2+1} \cdot Xeve2(n) \\
&= (-1)^{(n-1)/2+1} \cdot (1/2)En & : odd[X(n)] \\
& & : n \text{ is odd number}
\end{aligned}
$$

Next, the output signals of the third and fourth multiplier 427 and 428 are added in the adder 429 and the added signal is output from the output terminal 412. The output value Xadd(n) of the adder 429 is expressed as follows.

$$
\begin{aligned}
Xadd(n) &= Xm3(n) + Xm4(n) & (27)\\
&= (-1)^{n/2} \cdot Xave1(n) \\
&= (-1)^{n/2} \cdot (1/2)En & : even[Xm1(n)] \\
& & : n \text{ is even number} \\
&= (-1)^{(n-1)/2+1} \cdot Xeve2(n) \\
&= (-1)^{(n-1)/2+1} \cdot (1/2)En & : odd[Xm2(n)] \\
& & : n \text{ is odd number}
\end{aligned}
$$

Therefore, in this embodiment of the clock recovery circuit, the clock component output from the adder 429 is the symbol clock included in the received signals and thus no slip of the recovered clock is caused. Also, by using the construction composed of the non-linear processor, the inverters, the first low-pass filters, the adder and the Modulus 4 counter, the extraction of the symbol clock component can be made possible. Further, in place of the COS/−SIN output circuit 422, a COS/SIN output circuit can be used with similar results.

The sixth embodiment of the present invention will now be described.

Figure 13:
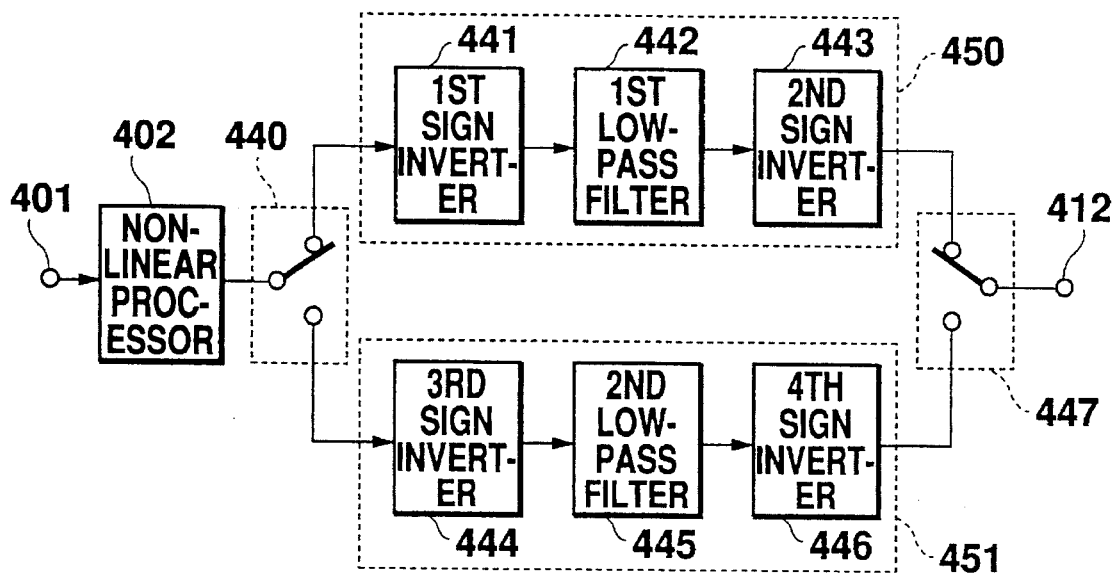
FIG. 13 is a block diagram of a sixth embodiment of a clock recovery circuit according to the present invention.
Figure 14:
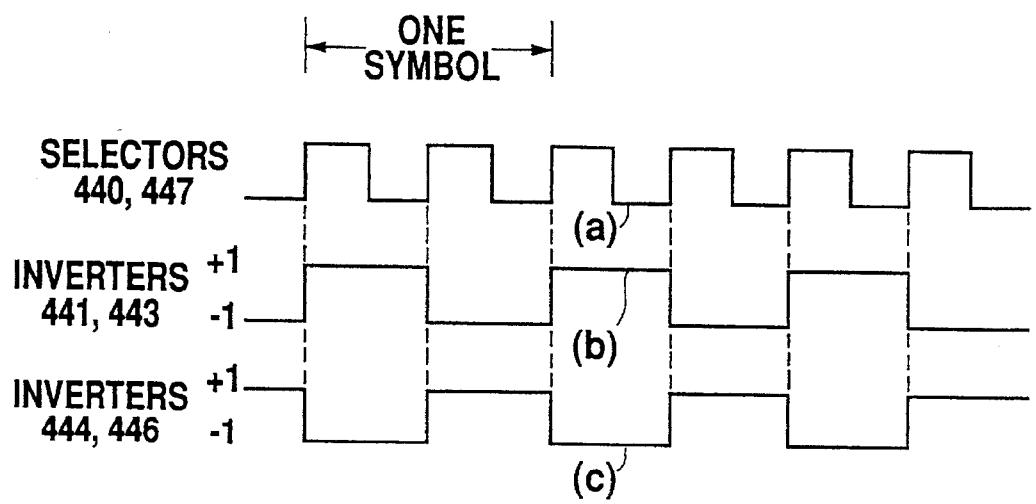
FIG. 14 is a timing chart showing waveforms of control signals of selectors and sign inverters shown in FIG. 13.

FIG. 13 shows the sixth embodiment of a clock recovery circuit according to the present invention. In FIG. 13, a first selector 440 alternately switches the output of the non-linear processor 402 at a frequency of nearly 4 times the symbol clock frequency of the received signals. A first sign inverter 441 switches a code inversion/non-inversion at a frequency of nearly two times the symbol clock frequency. A first low-pass filter 442 averages the output value of the first sign inverter 441. A second sign inverter 443 inputs the output signal of the first low-pass filter 442 and operates in the same manner as the first sign inverter 441 in synchronism therewith. The first sign inverter 441, the first low-pass filter 442 and the second code inverter 443 constitute a first sign inversion/average section 450 which operates at a frequency of nearly two times the symbol clock frequency. A third sign inverter 444 switches a sign conversion/non-conversion in the same cycle as the first code inverter 441. A second low-pass filter 445 averages the output value of the third sign inverter 444. A fourth sign inverter 446 inputs the output signal of the second low-pass filter 445 and operates in the same manner as the third sign inverter 444 in synchronism therewith. The first sign inverter 444, the first low-pass filter 445 and the second sign inverter 446 constitute a second sign inversion/average section 451 which operates in the same manner as the first sign inversion/average section 450. Also, a second selector 447 operates in synchronism with the first selector 440. The first and second selectors 440 and 447 cooperates with each other to alternately select one of the first and second sign inversion/average sections 450 and 451. FIG. 14 illustrates waveforms of control signals of the first and second selectors 440 and 447 and the first to fourth code inverters 441, 443, 444 and 446.

In the fifth embodiment shown in FIG. 11, as described above, due to the orthogonality of the COS and −SIN, when the COS value of the COS/−SIN output circuit 422 is ±1, the −SIN value is always 0, and, when the −SIN value is ±1, the COS value is always 0. Hence, in the formulas (24), (25), (26) and (27), when the time n is an even number, that is, the COS value is ±1, the output values of the second and fourth multipliers 424 and 428 become 0, and, in turn, when the time n is an odd number, that is, the −SIN value is ±1, the first and third multipliers 425 and 427 become 0. Thus, even when two blocks are alternately operated, the output signal of the adder 429 becomes the same.

Hence, in FIG. 13, after the received signal input via the input terminal 401 is processed in the non-linear processor 402 to produce the clock component, the produced clock component is alternately sent out to the first sign inversion/average section 450 and the second sign inversion/average section 451. For example, in FIG. 14, when the control signals of the first and second selectors 440 and 447 is "H", the first sign inversion/average section 450 is selected and, in turn, when the control signals are "L", the second sign inversion/average section 451 is selected.

In the first sign inverter 441 of the first sign inversion/average section 450, the inversion/non-inversion of the input signal is alternately executed at the frequency of nearly two times the symbol clock frequency. This corresponds to the multiplication of the COS(π) by the COS(0). In FIG. 14, (b) shows a series of the operation of the first sign inverter 441. For example, when the control signals are "H", the input signal becomes the output signal as it is, and, when the control signals are "L", the sign of the input signal is inverted and the inverted signal is output. Therefore, assuming that the output signal of the first sign inverter 441 is XR1(n), this can be expressed as follows.

$$XR1(n)=(-1)^{n/2} \cdot X(n): n \text{ is even number} \qquad (28)$$

The first low-pass filter 442 averages the inverted or non-inverted signal so as to remove the noise components and outputs the averaged output $X_{LPF1}(n)$ as follows.

$$X_{LPF1}(n)=En{:}even[XR1(n)] \quad (29)$$

The second sign inverter 443 operates in synchronism with the first sign inverter 441 to execute the inversion or non-inversion of the output signal of the first low-pass filter 442 to output XR2(n) as follows.

$$\begin{aligned} XR2(n) &= (-1)^{n/2} \cdot X_{LPF1}(n) \quad (30)\\ &= (-1)^{n/2} \cdot En : even[XR1(n)] \end{aligned}$$

Then, XR2(n) is output from the output terminal 412 via the second selector 447.

Similarly, the output value XR4(n) of the second sign inversion/average section 451, that is, the fourth sign inverter 446 is represented as follows.

$$XR4(n)=(-1)^{(n-1)/2+1} \cdot (\tfrac{1}{2})En{:}odd[XR3(n)]+tm \quad (31)$$

In this formula, XR3(n) represents the output signal of the third sign inverter 444 and in FIG. 14, (c) shows one example of the operations of the third and fourth sign inverters 444 and 446.

Hence, the output signal XSEL(n) of the second selector 447 is expressed as follows.

$$\begin{aligned} XSEL(n) &= XR2(n) & &(32)\\ &= (-1)^{n/2} \cdot En & &: even[XR1(n)]\\ & & &: n \text{ is even number}\\ &= XR4(n) & &\\ &= (-1)^{(n-1)/2+1} \cdot (1/2)En & &: odd[XR3(n)]\\ & & &: n \text{ is odd number} \end{aligned}$$

Since XR1(n) and XR3(n) are equivalent to Xm1(n) and Xm3(n), respectively, in formula (27), XSEL(n) becomes a sine wave having an amplitude of two times the Xadd(n) and the same phase relationship as the same and thus the same effects as the fifth embodiment described above can be obtained. Hence, in this embodiment, even when the selectors are used in place of the adder and two systems of the sign inversion/average sections are alternately operated at the frequency of two times the symbol rate, the clock component can be extracted.

In this case, the first to fourth sign inverters 441, 443, 444 and 446 operate in synchronism with the first and second selectors 440 and 447 and it is sufficient that the operation frequency is two times the symbol rate. Thus, it is not necessary to satisfy the relationship shown by (b) and (c) in FIG. 14. That is, the first and second sign inverters 441 and 443 may have the relationship of the inversion and the first and third sign inverters 441 and 444 may output the same value. However, in this case, the phase of the recovered clock output from the second selector 447 is changed.

The seventh embodiment of the present invention will now be described.

Figure 15:
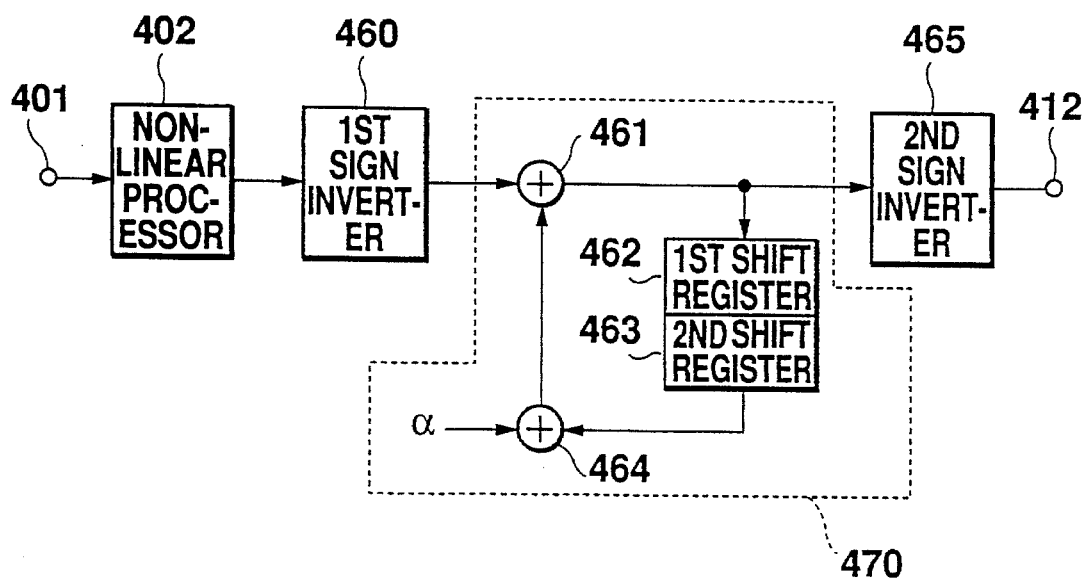
FIG. 15 is a block diagram of a seventh embodiment of a clock recovery circuit according to the present invention.

FIG. 15 illustrates the seventh embodiment of a clock recovery circuit according to the present invention. In this embodiment, a primary IIR (infinite impulse response) filter is used.

Figure 16:
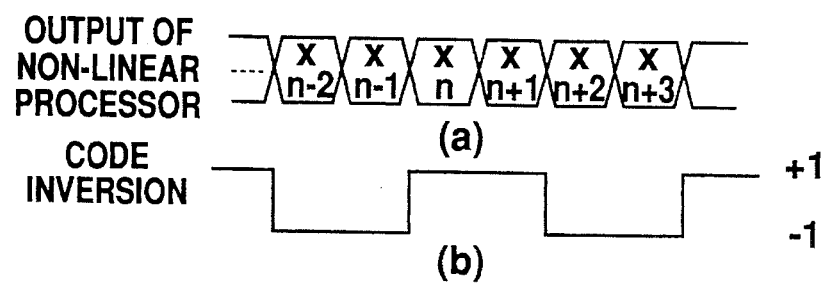
FIG. 16 is a timing chart showing an operation of an non-linear processor and sign inverters shown in FIG. 15.

In FIG. 15, a first sign inverter 460 executes an inversion/non-inversion of the output signal of the non-linear processor 402 at a frequency of two times the symbol clock frequency. A first adder 461 adds an output of a second adder 464, hereinafter described, to the output signal of the first sign inverter 460. A first shift register 462 latches the output value of the first adder 461 and a second shift register 463 latches the output value of the first shift register 462. The second adder 464 adds a coefficient α to the output signal of the second shift register 463. In this case, the first adder 461, the first shift register 462, the second shift register 463 and second adder 464 constitute a parallel IIR filter 470. A second sign inverter 465 executes an inversion/non-inversion of the output value of the parallel IIR filter 470 in synchronism with the first sign inverter 460. Also, FIG. 16 shows one example of the output signal of the non-linear processor 402 and operational timings of the first and second sign inverters 460 and 465.

In this embodiment, the output signal of the non-linear processor 402 is inverted/non-inverted at the frequency of nearly two times the clock frequency in the first sign inverter 460. In FIG. 16, (a) shows the output timing of the non-linear processor 402 and (b) shows the operational timing of the first sign inverter 460. Now, assuming that the output signal of the first sign inverter 460 is XS(n), this value is expressed as follows.

$$\begin{aligned} XS(n) &= (-1)^{n/2} \cdot X(n) & n: \text{even number} \quad (33)\\ &= (-1)^{(n-1)/2+1} \cdot X(n) & n: \text{odd number} \end{aligned}$$

This formula is equivalent to the following processing.

$$\begin{aligned} XS(n) &= X(n) \cdot \{\cos(0) - \sin(0)\} & &(34)\\ & & &: MOD(n,4)=0\\ &= X(n) \cdot \{\cos(\pi/2) - \sin(\pi/2)\} & &\\ & & &: MOD(n,4)=1\\ &= X(n) \cdot \{\cos(\pi) - \sin(\pi)\} & &\\ & & &: MOD(n,4)=2\\ &= X(n) \cdot \{\cos(3\pi/2) - \sin(3\pi/2)\} & &\\ & & &: MOD(n,4)=3 \end{aligned}$$

Now, assuming that the value stored in the second shift register 463 is YCOS(n) and the value stored in the first shift register 462 is YSIN(n) at a certain time n, the output Xa(n) of the first adder 461 is expressed as follows.

$$Xa(n)=XS(n)+\alpha YCOS(n) \quad (35)$$

This value is stored in the first shift register 462 at a time n+1. At the same time, the value YSIN(n) stored in the first shift register 462 is stored in the second shift register 463. Also, the outputs of the first adder 461 at the times n+1, n+2, n+3 and n+4 are obtained as follows.

$$\begin{aligned} Xa(n+1) &= XS(n+1)+\alpha YSIN(n+1) \quad (36)\\ Xa(n+2) &= XS(n+2)+\alpha YCOS(n+2)\\ &= XS(n+2)+\alpha Xa(n)\\ Xa(n+3) &= XS(n+3)+\alpha YSIN(n+3)\\ &= XS(n+3)+\alpha Xa(n+1)\\ Xa(n+4) &= XS(n+4)+\alpha YCOS(n+4)\\ &= XS(n+4)+\alpha Xa(n+2) \end{aligned}$$

From the above formulas, the output signal of the first adder 461 is the output of the IIR filter 470, that is, $H(Z)=Xa(Z)/XS(Z)=1/(1+\alpha Z^{-2})$ wherein $Z=e^{j\omega T/4}$; T is a symbol cycle, and it is readily understood that the values of n-th even number and n-th odd number are averaged and are alternately output.

Hence, assuming that in the case that n is an even number, the output signal of the parallel IIR filter 470 is Rn:even(n) and in the case that n is an odd number, the output signal of the parallel IIR filter 470 is Rn:odd(n), the output signal Xo(n) of the second sign inverter 465 is expressed as follows.

$$Xo(n) = (-1)^{n/2} \cdot Rn: \text{even}(n) \quad : n \text{ is even number} \quad (37)$$
$$= (-1)^{(n-1)/2+1} \cdot Rn : \text{odd}(n) \quad : n \text{ is odd number}$$

Hence, this formula becomes substantially the same as the above-described formula (32).

Accordingly, in this embodiment, by providing the storage parts for the even and odd times in the average part, the parts other than the average part can be used in common for the even and odd times. In this case, it is not necessary to operate the first and second sign inverters 460 and 465 in the same manner. That is, for example, even in the case of the inverting operation, only the phase of the recovered clock is changed but the clock component can be extracted in the same manner. Further, it is not required to construct the average part by the primary IIR filter and by using a higher FIR (finite impulse response) filter or the IIR filter, the same effects can be obtained.

The eighth embodiment of the present invention will now be described.

Figure 17:
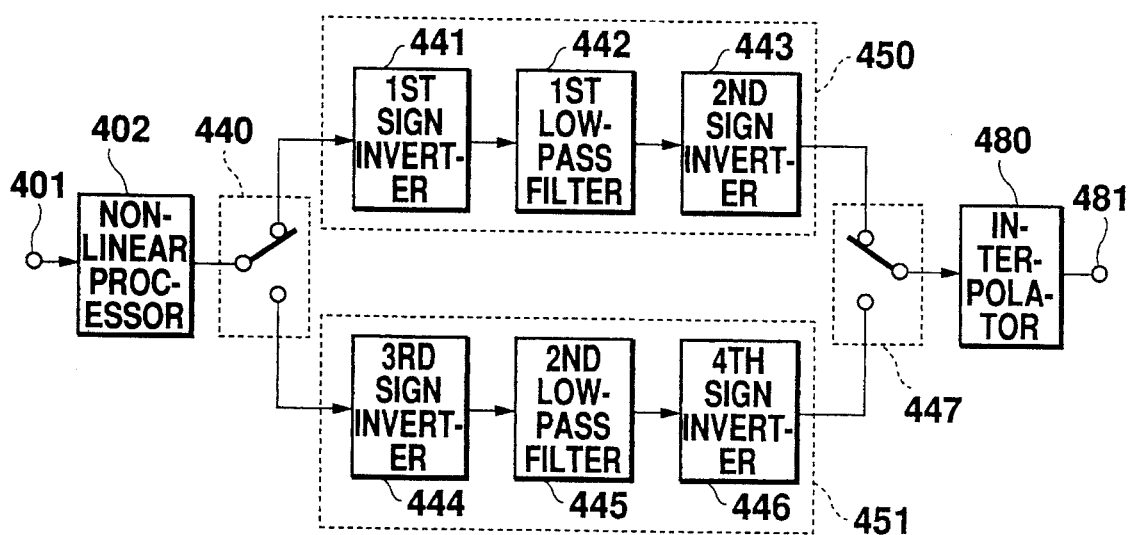
FIG. 17 is a block diagram of an eighth embodiment of a clock recovery circuit according to the present invention.

FIG. 17 illustrates the eighth embodiment of a clock recovery circuit according to the present invention, having the same construction as the sixth embodiment shown in FIG. 13, except that an interpolator 480 is further provided after the second selector 447. The interpolator 480 produces fine samples from a recovered clock of an oversampling of 4 times, output from the second selector 447, by an interpolation and detects the recovered clock with high accuracy. and the output signal of the interpolator 480 is output from an output terminal 481.

Figure 18:
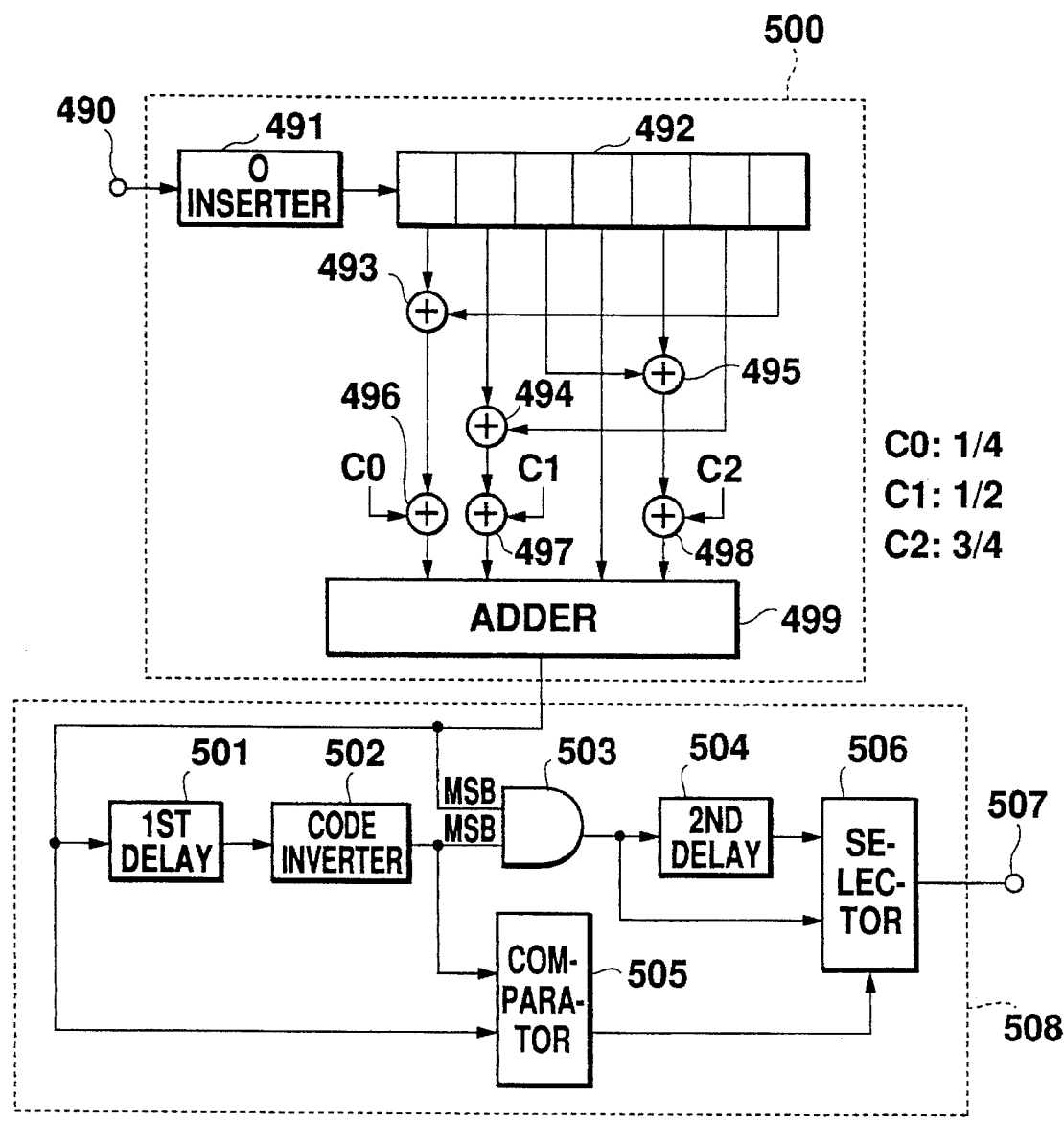
FIG. 18 is a block diagram of an interpolator shown in FIG. 17.

FIG. 18 shows one embodiment of the interpolator 480 shown in FIG. 17. In the interpolator 480 shown in FIG. 18, a phase of a recovered clock of an oversampling of 16 times can be obtained from the recovered clock of the oversampling of 4 times by a primary interpolation operation. In FIG. 18, the signal input via an input terminal 490 is inserted with "0" in a zero inserter 491. The zero inserter 491 is operated by a clock of 16 times the symbol clock and inserts sample data once per 4 clocks and "0" the remain-ing three times. A shift register 492 stores the 0-inserted data. A first adder 493 sums the values held at the first and seventh stages of the shift register 492, a second adder 494 sums the values held in the second and sixth stages of the shift register 492, and a third adder 495 sums the values held in the third and fifth stages of the shift register 492. Also, a first multiplier 496 multiplies a coefficient $C_0$ to the output signal of the first adder 493, a second multiplier 497 multiplies a coefficient $C_1$ to the output signal of the second adder 494, and a third multi-plier 498 multiplies a coefficient $C_2$ to the output signal of the third adder 495. Further, a fourth adder 499 sums the output values of the first to third multipliers 496, 497 and 498 and the value held at the fourth stage of the shift register 492. The zero inserter 491, the shift register 492, the first to fourth adders 493, 494, 495 and 499 and the first to third multipliers 496, 597 and 498 constitute a primary interpolation filter circuit 500.

A first delay circuit 501 delays the output signal of the primary interpolation filter circuit 500 one clock amount by using a clock of 16 times. A sign inverter 502 inverts the output signal of the first delay circuit 501. An AND circuit 503 calculates an AND of the MSB (most significant bit) of the output signal of the primary interpolation filter circuit 500 and the MSB of the output of the sign inverter 502. A second delay circuit 504 delays the output signal of the AND circuit 503 one clock period by using the clock of 16 times. A comparator 505 compares the output value of the primary interpolation filter circuit 500 with the output value of the sign inverter 502. A selector 506 inputs the output signal of the comparator 505 and outputs one of the output signal of the AND circuit 503 and the output signal of the second delay circuit 504. The signal selected by the selector 506 is output from an output terminal 507. The first delay circuit 501, the sign inverter 502, the AND circuit 503, the second delay circuit 504, the comparator 505 and the selector 506 constitute a leading edge detector 508. Also, FIG. 19 shows one example of waveforms in some portions for showing the operation within the interpolator 480.

Next, the operation of the eighth embodiment of the clock recovery circuit described above will be described with reference to FIG. 17, FIG. 18 and FIG. 19.

Figure 19:
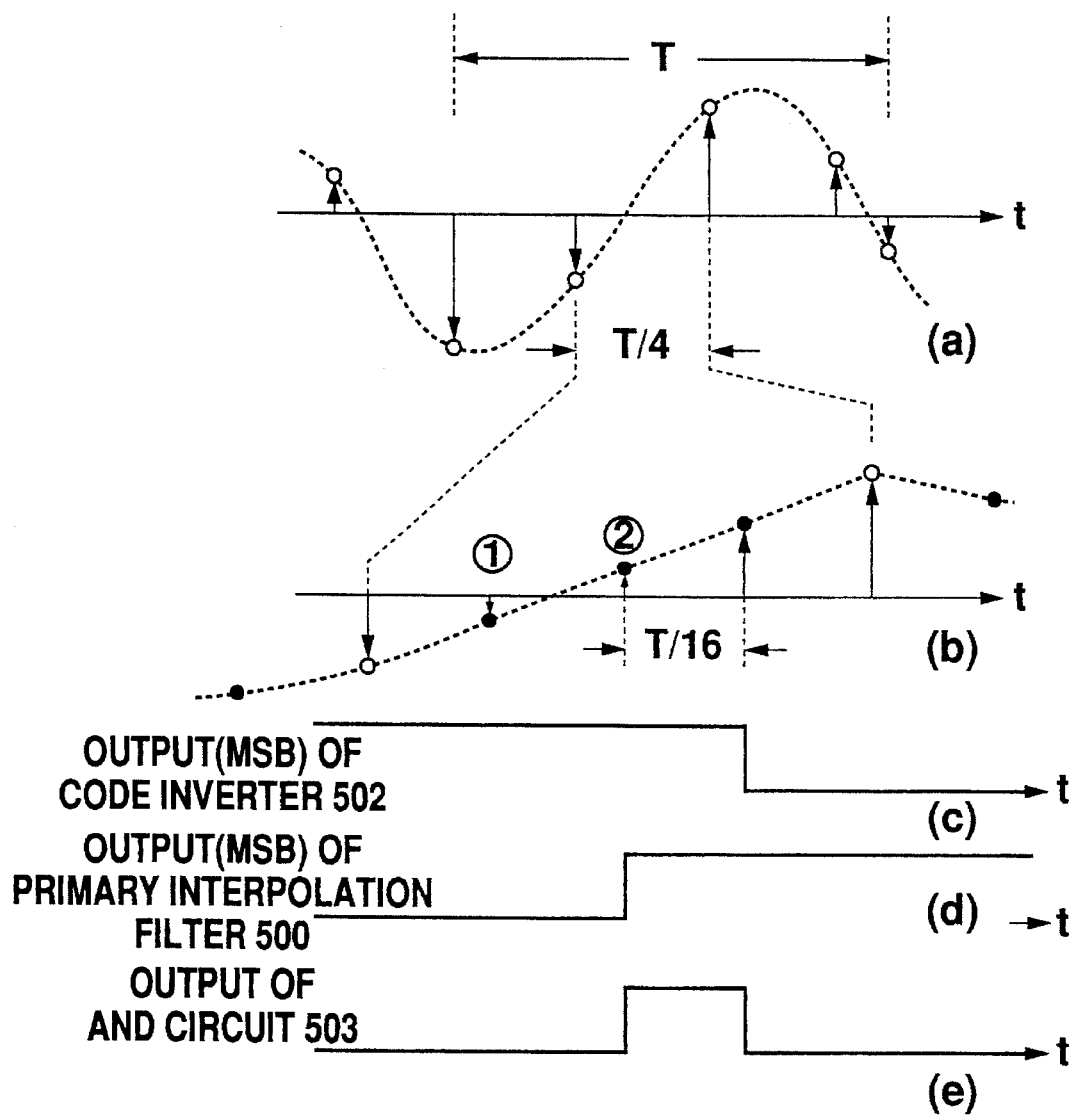
FIG. 19 is a timing chart showing waveforms of signals at some portions in FIG. 17.

In FIG. 19, (a) shows the waveform of the recovered clock sampled by the clock of 4 times and this clock is input via the input terminal 490 shown in FIG. 18. The input recovered clock is inserted with "0" in the zero inserter 491 to be converted into the data of the clock of 16 times. For example, when XSEL(n), XSEL(n+1) and XSEL(n+2) are input to the zero inserter 491, the zero inserter 491 outputs . . . , XSEL(n), 0, 0, 0, XSEL(n+1), 0, 0, 0, XSEL(n+2), 0, 0, 0 . . . The 0-inserted signals are primarily interpolated and the interpolated recovered clock of the oversampling of 16 times is output from the fourth adder 499. In FIG. 19, (b) shows one example of the output signal of the fourth adder 499, that is, the output signal of the primary interpolation filter circuit 500.

The AND circuit 503 calculates the AND of the MSB of the output signal of the primary interpolation filter circuit 500 and the MSB of the output signal of the sign inverter 502 to detect the occurrence of the leading edge (that is, the transition from negative to positive) of the recovered clock. In FIG. 19, (c) shows a waveform of the MSB of the output signal of the sign inverter 502 corresponding to the waveform shown in (b), (d) shows a waveform of the MSB of the output signal of the primary interpolation filter circuit 500, and (e) shows an output waveform of the AND circuit 503. As described above, the AND circuit 503 generates the pulse every time the leading edge occurs in the recovered clock and the occurrence of the leading edge between the sample points (1) and (2) in the waveform shown by (b) in FIG. 19 can be recognized.

Next, which of the sample points (1) and (2) of the waveform shown in FIG. 19(b) is nearer to the original zero cross point will be detected. The comparator 505 compares the output signal of the sign inverter 502 with the output signal of the first interpolation filter circuit 500. At the time point when the AND circuit 503 detects the leading edge, both the signals are positive and the discriminating of the nearer point to the zero cross point corresponds to the comparing of the absolute values of the sample points (1) and (2). The sample point of the smaller absolute value is considered to be the zero cross point. For example, the selection signal is supplied from the comparator 505 to the selector 506 so that, when the sample point (1) is considered as the zero cross point, the output signal of the AND circuit 503 is selected by the selector 506, and, when the sample point (2) is considered as the zero point, the output signal of the second delay circuit 504 is selected by the selector 506. In this manner, a leading edge detection pulse with with precision of the clock of 16 times can be output from the output terminal 507. Thus, the output zero cross detection pulse is converted into Nyquist point information in a following circuit.

Hence, by adding the interpolator to the structure of the previous embodiments, the Nyquist point information can be obtained with high precision. In this embodiment, although the primary interpolation with the precision of the clock of 16 times is applied, with this interpolation of higher order or with high accuracy, the similar effects can be obtained. When the interpolation is changed in such a manner, a variation is only caused in the accuracy of the zero point information. Also, of course, the detection of the Nyquist point information can be carried out with the same effects by using information other than the zero cross point, for instance, a detection of the maximum point of the amplitude.

The ninth embodiment of the present invention will now be described.

Figure 20:
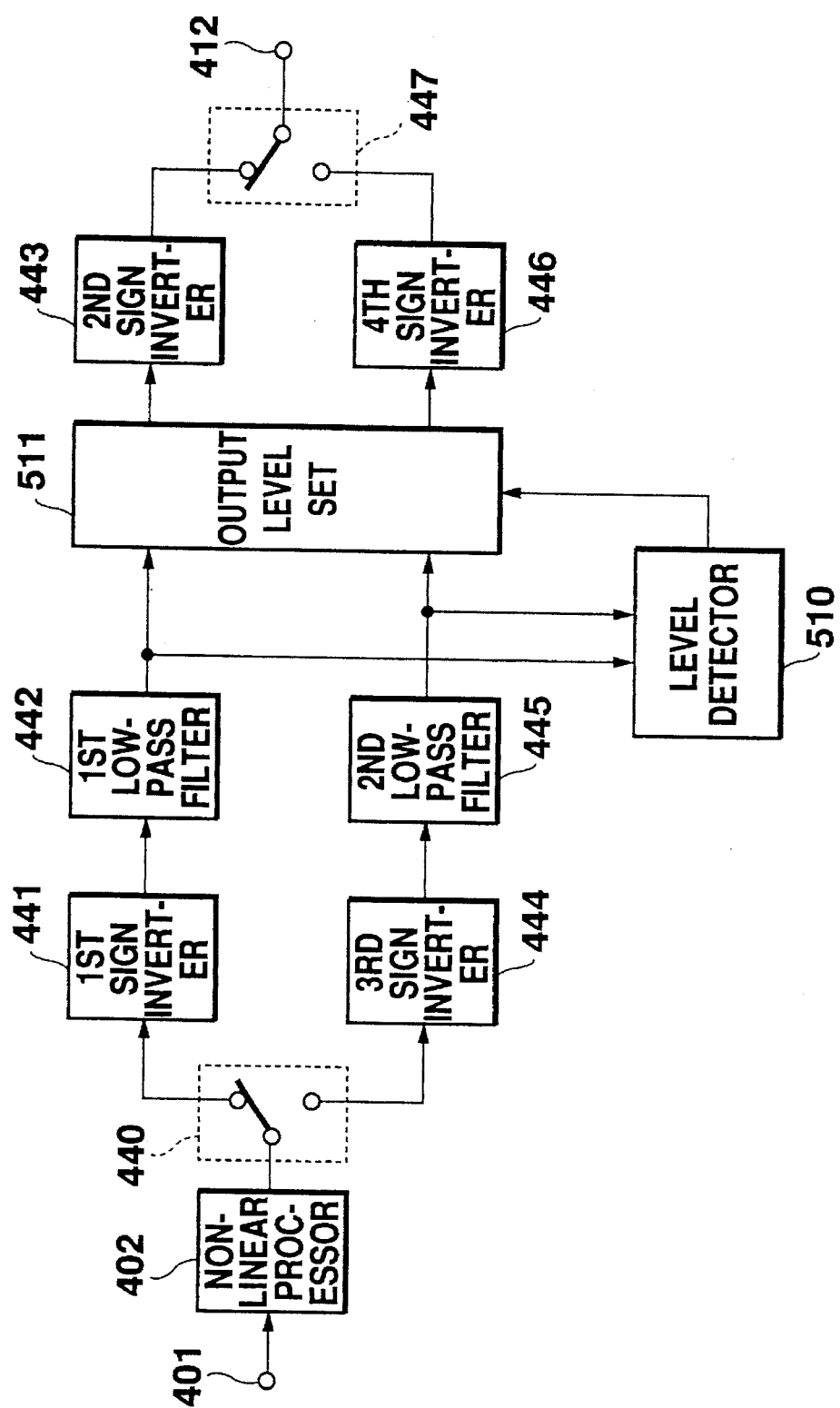
FIG. 20 is a block diagram of a ninth embodiment of a clock recovery circuit according to the present invention.
Figure 21:
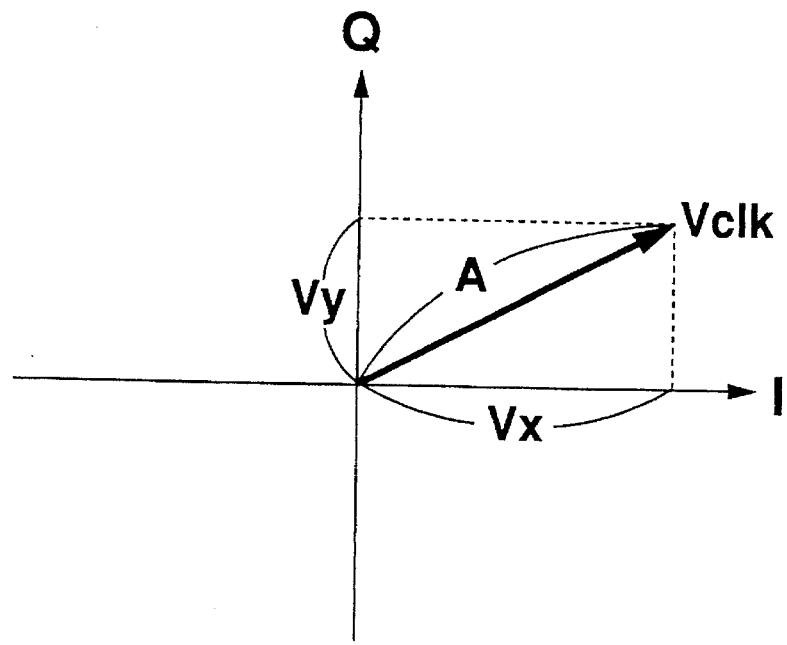
FIG. 21(a) is a schematic view showing a relationship between output signals of low-pass filters on a phase plane in the ninth embodiment shown in FIG. 20.
FIG. 21(b) is a schematic view showing a waveform of a recovered clock in the ninth embodiment shown in FIG. 20.
Figure 21:
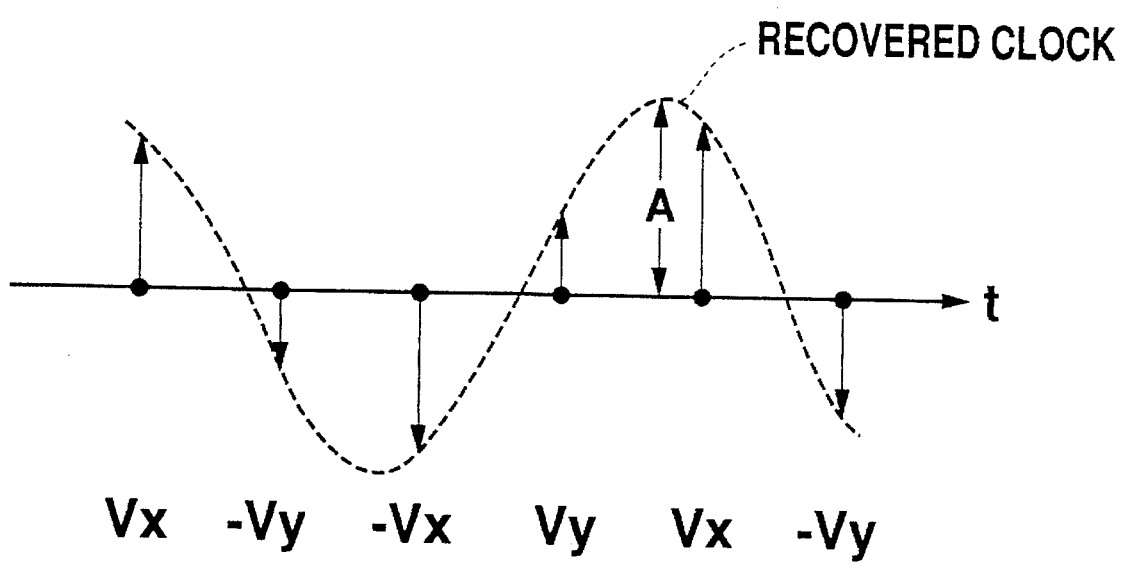

FIG. 20 shows the ninth embodiment of a clock recovery circuit according to the present invention, having the same construction as the sixth embodiment shown in FIG. 13, except that a level detector 510 and an output level set circuit 511 are further provided. In this embodiment, the level detector 510 inputs the output signals of the first and second low-pass filters 442 and 445 and detects levels of the signals stored in the first and second low-pass filters 442 and 445. The output level set circuit 511 controls the output levels of the output signals of the first and second low-pass filters 442 and 445 according to the output signal of the level detector 510. FIG. 21 shows the clock components of the signals stored in the first and second low-pass filters 442 and 445 in the form of vectors.

Next, the operation of the ninth embodiment of the clock recovery circuit described above will now be described in connection with FIG. 20, FIG. 21(a) and FIG. 21(b).

In FIG. 21(a), there is shown one example of the relationship between the output signals of the first and second low-pass filters 442 and 445 and the recovered clock, that is, the output signal of the second selector 447. Now, assuming that the output values of the first and second low-pass filters 442 and 445 are Vx and Vy, respectively, the recovered clock can be produced in a manner, as shown by in FIG. 21(b). Also, a recovered clock vector $V_{clk}$ on a phase surface is expressed in the relationship shown by (a) in FIG. 19 and its amplitude A can be obtained as follows.

$$A = (Vx^2 + Vy^2)^{1/2} \tag{38}$$

Hence, the level detector 510 calculates the amplitude A of the recovered clock by using formula (38) on the basis of the output values Vx and Vy of the first and second low-pass filters 442 and 445 and supplies the obtained value to the output level set circuit 511.

The output level set circuit 511 inputs the amplitude A from the level detector 510 and calculates the following against the output values Vx and Vy of the first and second low-pass filters 442 and 445 to output Vnx and Vny.

$$Vnx = Vx/A$$

$$Vny = Vy/A \tag{39}$$

Hence, the amplitude of the recovered clock by using the output values Vnx and Vny of the output level set circuit 511 becomes "1" and the recovered clock always having the amplitude of "1" can be obtained. Thus, in this embodiment, a kind of limiter effect can be obtained and a bit number of a circuit or circuits positioned after the output level set circuit 511 can be reduced.

Further, it is not always necessary to allow the level detector 510 to execute the calculation like formula (39), and, for example, by using a larger absolute value |Vmax| of the output values Vx and Vy, the calculation can be preferably carried out. In this case, a difference of $2^{1/2}$ times up to the maximum between the amplitude A and Vmax is caused but this difference can be adjusted by the output level set circuit 511 with no problem. Further, the output level set circuit 511 can be also realized as a simplified construction by a selection of the output bits.

The tenth embodiment of the present invention will now be described.

Figure 22:
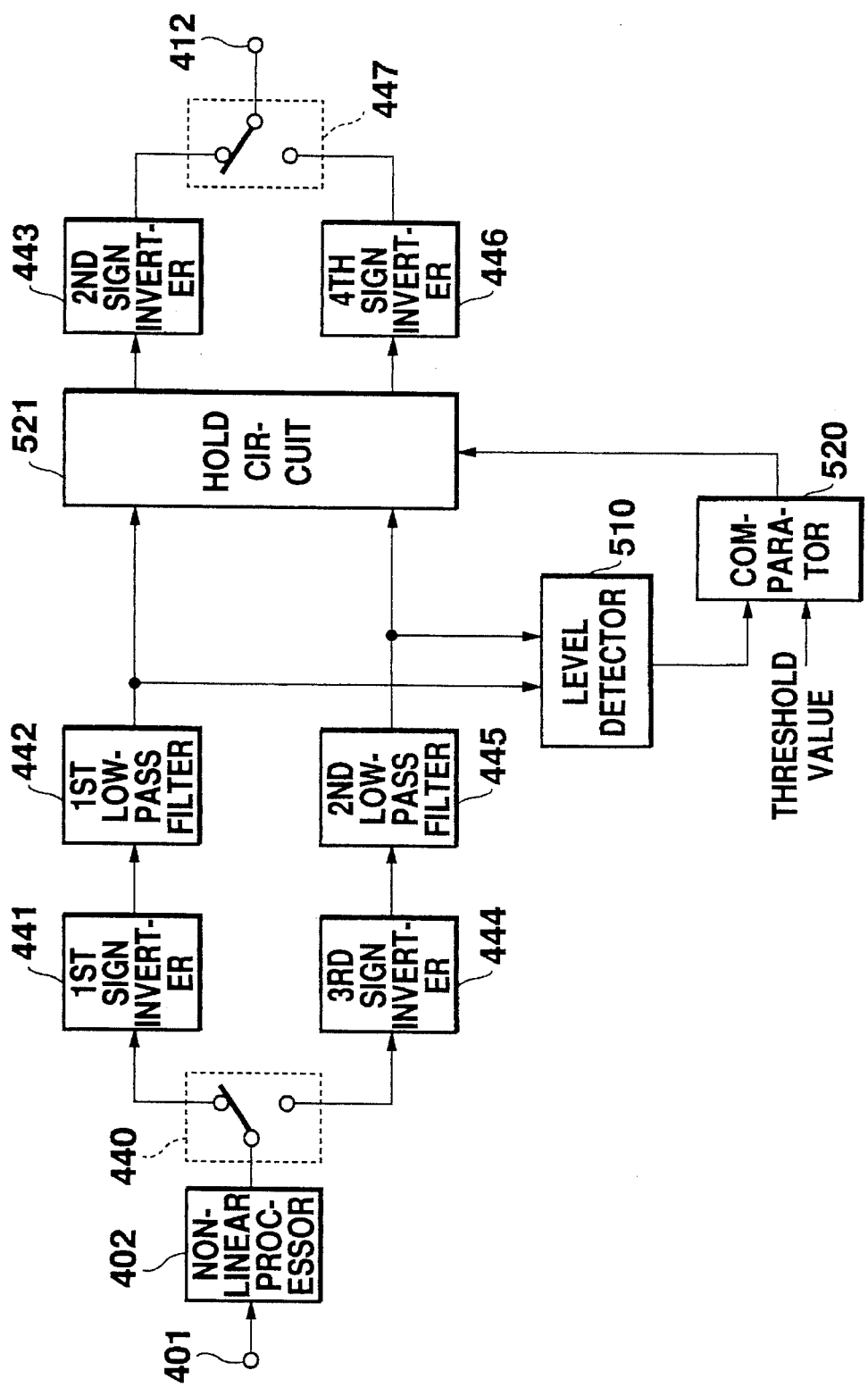
FIG. 22 is a block diagram of a tenth embodiment of a clock recovery circuit according to the present invention.
Figure 23:
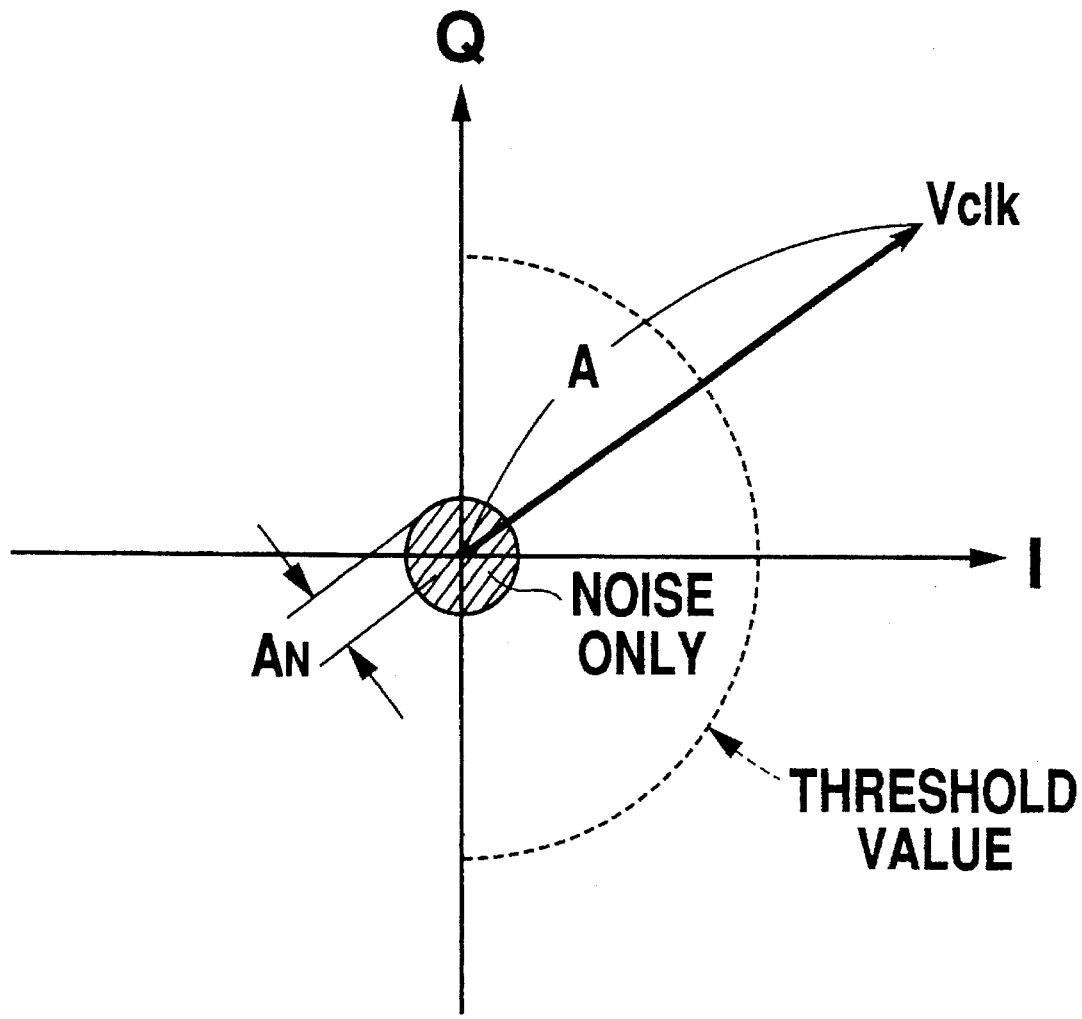
FIG. 23 is a schematic view showing a relationship between a symbol clock and a threshold value on a phase surface in the tenth embodiment shown in FIG. 22.
Figure 24:
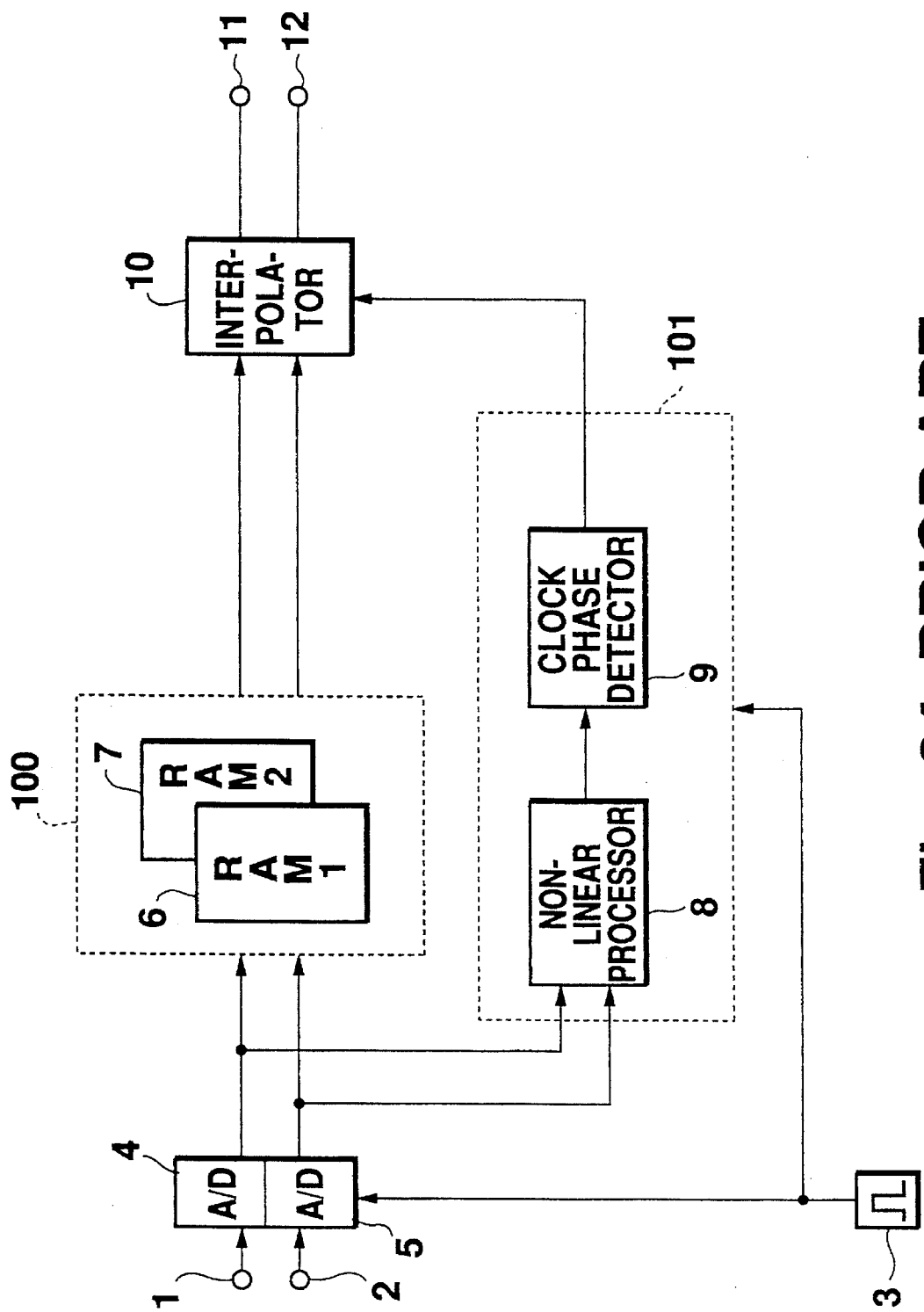
FIG. 24 is a block diagram of a conventional clock recovery circuit.
Figure 25:
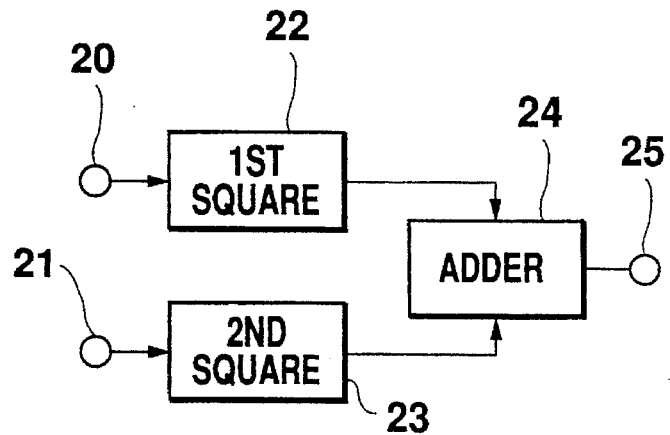
FIG. 25 is a block diagram of a non-linear processor shown in FIG. 24.
Figure 26:
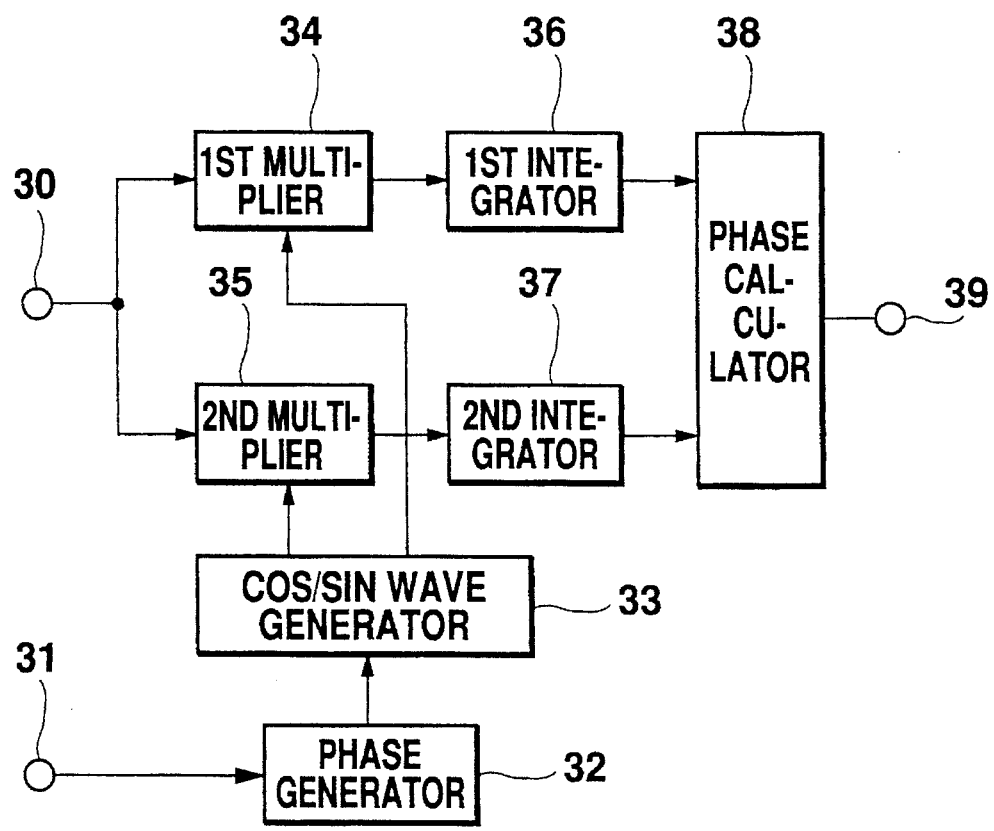
FIG. 26 is a block diagram of a clock phase detector shown in FIG. 24.
Figure 27:
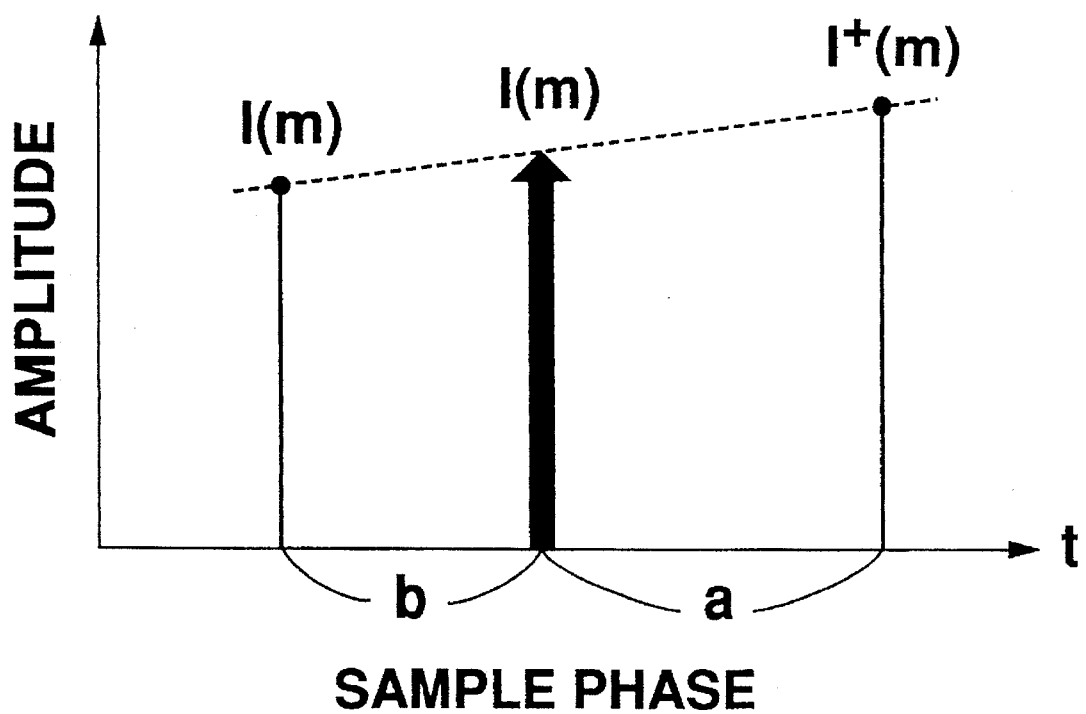
FIG. 27 is a schematic view showing a principle of an interpolation processing according to the first-order Lagrange's formula in the clock recovery circuit shown in FIG. 24.

FIG. 22 shows the tenth embodiment of a clock recovery circuit according to the present invention, having the same construction as the ninth embodiment shown in FIG. 20, except that a comparator 520 and a hold circuit 521 are provided in place of the output level set circuit 511. In this embodiment, the comparator 520 compares the output value of the level detector 510 with a predetermined threshold value. As a result, when the output value of the level detector 510 is smaller than the threshold value, the comparator 520 outputs a hold signal to the hold circuit 521. The hold circuit 521 inputs the hold signal from the comparator 520 and holds the output values of the first and second low-pass filters 442 and 445. FIG. 23 shows the symbol clock component stored in the first and second low-pass filters 442 and 445 in the form of vector and particularly a relationship with respect to the threshold value.

Next, the operation of the tenth embodiment of the clock recovery circuit described above will be described in connection with FIG. 22 and FIG. 23.

In FIG. 23, when the symbol clock component is extracted, the amplitude A of the recovered clock vector $V_{clk}$ is large and, when the received signal becomes only the noise component due to deep fade, blockage or the like, the amplitude is small like $A_N$. Hence, when the amplitude of the vector $V_{clk}$ of the recovered clock detected by the level detector 510 becomes smaller than the predetermined threshold value, the comparator 520 outputs the hold signal to the hold circuit 521 and the hold circuit 521 holds the output values of the first and second low-pass filters 442 and 445 at that time. Then, after the receiving of the signals is started again, when the amplitude of the $V_{clk}$ of the recovered clock is beyond the predetermined threshold value, the comparator 520 outputs a pass signal to the hold circuit 521 and the hold circuit 521 allows the output values of the first and second low-pass filters 442 and 445 to pass.

In this embodiment, as described above, even when the signals can not be received due to the deep fade, blockage or the like, the clock recovery circuit can keep the synchronization state. Further, in this embodiment, by multiplying the COS value and the –SIN value to the output values of the respective first and second low-pass filters again and summing the multiplied results, the symbol clock component included in the received signal can be output and slip of the recovered clock is prevented. Also, by using the COS value and the –SIN value oversampled with 4 times, that is, ±1 and 0, it is not always necessary to use the usual multipliers in the multiplying parts of the COS value and the –SIN value and by only selecting one of inversion/non-inversion/0, similar effects can be obtained. Hence, a clock recovery circuit using a small amount of hardware can be realized.

As described above, according to the present invention, in a clock recovery circuit, an interpolator or a latch circuit is operated in synchronism with a cycle of a symbol clock included in a received signal and, even when a demodulator sampling the received signals by using a fixed frequency clock is operated in a continuous mode, decision point data can be output without causing slip of a recovered clock.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. A clock recovery circuit for a demodulator, receiving a digital signal representative of a received, detected, quasi-coherent analog signal, comprising:

a non-linear processor having an input for receiving the digital signal and having a processed signal output:

a source of digital, four-times oversampled COS/–SIN value pairs, including
a fixed oscillator producing a clock,
a modulo four counter connected to receive the clock and producing a count, and
a COS/–SIN value pair generator, generating value pairs according to:

| Count | COS | –SIN |
|-------|-----|------|
| 0 | 1 | 0 |
| 1 | 0 | –1 |
| 2 | –1 | 0 |
| 3 | 0 | 1; | a first pair of multipliers, connected to receive the processed signal as one input and connected to receive the COS/–SIN value pairs as another input, and producing first and second results;

a pair of time averaging circuits connected to receive the first and second results, and producing first and second averaged results;

a second pair of multipliers, connected to receive the first and second averaged results as one input and connected to receive the COS/–SIN value pairs as another input, and producing third and fourth results; and a summing circuit connected to receive the third and fourth results and produce an output signal.

2. The circuit of claim 1, wherein the first pair of multipliers further comprises:

a first multiplier connected to receive the processed signal as one input and connected to receive a COS value from the COS/–SIN value pairs and produce the first result; and a second multiplier connected to receive the processed signal as one input and connected to receive a –SIN value from the COS/–SIN value pairs and produce the second result.

3. The circuit of claim 2, wherein the second pair of multipliers further comprises:

a third multiplier connected to receive the first averaged result as one input and connected to receive the COS value from the COS/–SIN value pairs and produce the third result; and a fourth multiplier connected to receive the second averaged result as one input and connected to receive the –SIN value from the COS/–SIN value pairs and produce the fourth result.

* * * * *